United States Patent
Takenaka et al.

(10) Patent No.: US 8,874,319 B2
(45) Date of Patent: Oct. 28, 2014

(54) INVERTED PENDULUM TYPE VEHICLE

(71) Applicant: Honda Motor Co., Ltd., Tokyo (JP)

(72) Inventors: Toru Takenaka, Saitama (JP); Shinya Shirokura, Saitama (JP); Hideo Murakami, Saitama (JP); Makoto Araki, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 108 days.

(21) Appl. No.: 13/769,479

(22) Filed: Feb. 18, 2013

(65) Prior Publication Data

US 2013/0304320 A1    Nov. 14, 2013

(30) Foreign Application Priority Data

May 14, 2012   (JP) ................... 2012-111037

(51) Int. Cl.
| | |
|---|---|
| *A01B 69/00* | (2006.01) |
| *B62D 6/00* | (2006.01) |
| *B62D 11/00* | (2006.01) |
| *B62D 12/00* | (2006.01) |
| *B63G 8/20* | (2006.01) |
| *B63H 25/04* | (2006.01) |
| *G05D 1/00* | (2006.01) |
| *G06F 7/00* | (2006.01) |
| *G06F 17/00* | (2006.01) |
| *G06F 19/00* | (2011.01) |
| *B60B 19/00* | (2006.01) |
| *B62H 7/00* | (2006.01) |
| *B62K 17/00* | (2006.01) |
| *B62K 1/00* | (2006.01) |
| *B62K 11/00* | (2006.01) |
| *B62K 3/00* | (2006.01) |

(52) U.S. Cl.
CPC ............ *B62D 11/003* (2013.01); *B60B 19/003* (2013.01); *B62H 7/00* (2013.01); *B62K 17/00* (2013.01); *B62K 1/00* (2013.01); *B62K 11/00* (2013.01); *B62K 3/007* (2013.01)

USPC .............. 701/41; 701/22; 701/70; 180/21; 180/218

(58) Field of Classification Search
USPC ............ 701/1, 22, 23, 24, 27, 36, 41, 70, 93; 180/21, 219, 220, 252, 6.24, 170, 172
See application file for complete search history.

(56) References Cited

U.S. PATENT DOCUMENTS

| | | | | |
|---|---|---|---|---|
| 4,223,753 | A  * | 9/1980 | Bradbury ................... | 180/6.2 |
| 7,293,790 | B2 * | 11/2007 | Byun et al. ................. | 280/262 |
| 7,878,284 | B1 * | 2/2011 | Shultz ....................... | 180/199 |
| 8,583,302 | B2 | 11/2013 | Akimoto et al. | |
| 2011/0209932 | A1 | 9/2011 | Takenaka et al. | |

FOREIGN PATENT DOCUMENTS

| | | |
|---|---|---|
| EP | 2 138 379 A1 | 12/2009 |
| JP | 2011-068165 A | 4/2011 |
| JP | 2011-068218 A | 4/2011 |
| TW | 201024114 A | 7/2010 |

OTHER PUBLICATIONS

Office Action issued May 20, 2014 in the corresponding Korean Patent Application 10-2013-0020264.

* cited by examiner

*Primary Examiner* — Rami Khatib
(74) *Attorney, Agent, or Firm* — Carrier Blackman & Associates, P.C.; Joseph P. Carrier; William D. Blackman

(57) ABSTRACT

An inverted pendulum type vehicle with a tiltable rider mounting section has a first travel operation unit and a second travel operation unit, which are disposed with an interval provided therebetween in the longitudinal direction and which are capable of traveling in all directions. In a situation wherein a predetermined representative point of the vehicle or the first travel operation unit is to be moved rightward or leftward, the traveling operations of the first travel operation unit and the second travel operation unit are controlled such that the travel velocity of the first travel operation unit and the travel velocity of the second travel operation unit in the lateral direction are different from each other.

8 Claims, 8 Drawing Sheets

INVERTED PENDULUM TYPE VEHICLE

BACKGROUND OF THE INVENTION

1. Field of the Invention

The present invention relates to an inverted pendulum type vehicle capable of traveling on a floor surface.

2. Description of the Related Art

There has conventionally been known an inverted pendulum type vehicle in which a rider mounting section tiltable relative to the vertical direction is attached to a base body, to which a travel operation unit that travels on a floor surface and an actuator that drives the travel operation unit are installed. The inverted pendulum type vehicle is configured to control the traveling motion of the travel operation unit by moving the supporting point of an inverted pendulum.

In, for example, Japanese Patent Application Laid-Open No. 2011-068165 (hereinafter referred to as Patent Document 1), an inverted pendulum type vehicle in which a travel operation unit is driven according to the tilt or the like of a rider mounting section thereby to permit travel on a floor surface in all directions, including the longitudinal direction and the lateral direction relative to a rider, has been proposed by the applicant of the present application.

The conventional inverted pendulum type vehicle disclosed in Patent Document 1 enables the rider to turn the vehicle by moving his/her upper body so as to gradually change the traveling direction of the vehicle. Generally, however, the rider has been required to have a high steering skill to accomplish a smooth turn.

Especially when the vehicle is traveling forward at a low velocity or when the vehicle is almost in a stopped state, it has been difficult even for a skilled rider to turn the vehicle, i.e., to change the direction thereof.

SUMMARY OF THE INVENTION

The present invention has been made with a view toward overcoming the drawbacks of the prior art described above, and an object thereof is to provide an inverted pendulum type vehicle with enhanced maneuverability to permit an easy turn of the vehicle.

To this end, an inverted pendulum type vehicle in accordance with the present invention has at least a first travel operation unit capable of traveling on a floor surface, a first actuator that drives the first travel operation unit, a base body to which the first travel operation unit and the first actuator are installed, and a rider mounting section attached to the base body such that the rider mounting section is tiltable relative to a vertical direction, wherein the first travel operation unit is configured to be capable of traveling in all directions, including a longitudinal direction and a lateral direction relative to a rider on the rider mounting section, by a driving force of the first actuator, the inverted pendulum type vehicle including:

a second travel operation unit, which is connected to the first travel operation unit or the base body with an interval provided from the first travel operation unit in the longitudinal direction and which is configured to be capable of traveling in all directions on a floor surface;

a second actuator which generates a driving force for causing the second travel operation unit to travel at least in the lateral direction; and a control unit, which controls the first actuator and the second actuator so as to cause the first travel operation unit and the second travel operation unit to carry out travel motions thereof according to at least the tilt of the rider mounting section, wherein the control unit is configured to carry out turning control processing, which is control processing for controlling the first actuator and the second actuator such that the travel velocity of the first travel operation unit and the travel velocity of the second travel operation unit in the lateral direction are different from each other in a situation in which a predetermined representative point of the inverted pendulum type vehicle that has been established beforehand or the first travel operation unit is to be moved leftward or rightward (a first aspect of the invention).

According to the first aspect of the invention, the inverted pendulum type vehicle (hereinafter referred to simply as "the vehicle" in some cases) is provided with, in addition to the first travel operation unit and the first actuator, the second travel operation unit, which is disposed with the interval provided in the longitudinal direction relative to the first travel operation unit and which is capable of traveling in all directions, and a second actuator, which generates the driving force for causing the second travel operation unit to travel in the lateral direction.

When the rider on the rider mounting section intends to turn the vehicle (including the changing of the direction), the rider normally attempts to tilt the rider mounting section by shifting the center of gravity of himself/herself relatively to the right or the left with respect to the rider mounting section so as to generate a rightward or leftward velocity component of the vehicle. In this case, since the rider mounting section has a tendency to tilt rightward or leftward, the control unit moves the first travel operation unit rightward or leftward thereby to prevent the rider mounting section from tilting.

Thus, in the situation wherein a predetermined representative point, such as a point fixed relative to the base body or the rider mounting section, of the vehicle or the first travel operation unit is being moved rightward or leftward, it is very likely that the rider is trying to turn the vehicle.

Hence, the control unit carries out the turning control processing, which is the control processing for controlling the first actuator and the second actuator such that the travel velocity of the first travel operation unit and the travel velocity of the second travel operation unit in the lateral direction are different from each other in the situation wherein the predetermined representative point of the vehicle or the first travel operation unit is being moved rightward or leftward.

This will turn the vehicle due to the difference between the travel velocity of the first travel operation unit and the travel velocity of the second travel operation unit in the lateral direction.

Thus, the inverted pendulum type vehicle according to the first aspect of the invention enables the rider on the rider mounting section to turn the vehicle simply by moving his/her body so as to move the first travel operation unit rightward or leftward, which consequently tilts the rider mounting section rightward or leftward.

Consequently, the inverted pendulum type vehicle according to the first aspect of the invention provides improved maneuverability, permitting easier turning of the vehicle.

In the first aspect of the invention, the control unit is preferably configured to carry out the turning control processing in a situation wherein the magnitude of the desired value or the observed value of the travel velocity of the predetermined representative point or the first travel operation unit moving rightward or leftward is a predetermined value or more so as to control the first actuator and the second actuator such that the travel velocity of the first travel operation unit and the travel velocity of the second travel operation unit in the lateral direction are the same with each other in a situation wherein the magnitude of the desired value or the observed value of the travel velocity is smaller than the predetermined value (a second aspect of the invention).

In the present invention, the "observed value" related to an arbitrary state quantity, such as the travel velocity, means an estimated value that has been estimated on the basis of the detection value of the state quantity obtained by an appropriate sensor or an estimated value that has been estimated from the detection value or values of one or more other state quantities having certain correlativity to the state quantity on the basis of the correlativity.

According to the second aspect of the invention, in the situation wherein the magnitude of the desired value or the observed value of the travel velocity of the predetermined representative point or the first travel operation unit moving rightward or leftward is smaller than the predetermined value, the first actuator and the second actuator are controlled such that the travel velocity of the first travel operation unit and the travel velocity of the second travel operation unit in the lateral direction are the same with each other.

This arrangement makes it possible to prevent the vehicle from being accidentally turned due to an unintended reel of the body of the rider when the rider does not intend to turn the vehicle. In addition, a translational travel of the vehicle in the lateral direction can be made, as necessary.

Further, in the situation wherein the magnitude of the desired value or the observed value of the velocity of the predetermined representative point or the first travel operation unit moving rightward or leftward is a predetermined value or more, the turning control processing is carried out, thus enabling the rider to easily turn the vehicle simply by explicitly moving his/her body rightward or leftward when turning the vehicle.

In the aforesaid second aspect of the invention, the control unit preferably carries out the turning control processing in a situation wherein the magnitude of the observed value of the velocity of the travel of the predetermined representative point, which has been set beforehand as a point fixed with respect to the rider mounting section, in a rightward or leftward direction is a predetermined value or more (a third aspect of the invention).

More specifically, a tilting motion of the rider mounting section in the lateral direction, i.e., a tilting motion about a longitudinal axis, is generated when the rider moves his/her body in the lateral direction. Therefore, the observed value of the velocity of the representative point, which has been set beforehand as the point fixed with respect to the rider mounting section and which is moving rightward or leftward, markedly reflects the motion of the body of the rider in the lateral direction.

Hence, in the situation wherein the magnitude of the observed value of the velocity of the representative point traveling rightward or leftward is the predetermined value or more, carrying out the turning control processing makes it possible to accurately reflect the rider's intention when turning the vehicle.

In the first to the third aspects of the invention, preferably, the control unit is configured to determine a desired value of a turn angular velocity of the inverted pendulum type vehicle on the basis of at least the desired value or the observed value of the velocity of the rightward or leftward travel of the predetermined representative point or the first travel operation unit and to control the velocities of the travels of the first travel operation unit and the second travel operation unit in the lateral direction on the basis of the desired value of the turn angular velocity through the intermediary of the first actuator and the second actuator, respectively, in the turning control processing (a fourth aspect of the invention).

According to the fourth aspect of the invention, the desired value of the turn angular velocity of the inverted pendulum type vehicle is determined on the basis of at least the desired value or the observed value of the velocity of the rightward or leftward travel of the predetermined representative point or the first travel operation unit in the turning control processing. This arrangement enables the rider to change the turn angular velocity of the vehicle to a desired turn angular velocity by adjusting the motion of his/her own body in the lateral direction.

In this case, for example, the desired value of the turn angular velocity is preferably determined such that the magnitude of the desired value increases as the magnitude of the desired value or the observed value of the velocity of the rightward or leftward travel of the predetermined representative point or the first travel operation unit increases.

The desired value of the turn angular velocity is preferably determined such that the magnitude thereof is a predetermined upper limit value or less.

Further, the inverted pendulum type vehicle in accordance with the present invention may adopt the following mode. An inverted pendulum type vehicle in accordance with the present invention has at least a first travel operation unit capable of traveling on a floor surface, a first actuator that drives the first travel operation unit, a base body to which the first travel operation unit and the first actuator are installed, and a rider mounting section attached to the base body such that the rider mounting section is tiltable relative to a vertical direction, wherein the first travel operation unit is configured to be capable of traveling in all directions, including a longitudinal direction and a lateral direction relative to a rider on the rider mounting section, by a driving force of the first actuator, the inverted pendulum type vehicle including:

a second travel operation unit, which is connected to the first travel operation unit or the base body with an interval provided from the first travel operation unit in the longitudinal direction and which is configured to be capable of traveling in all directions on a floor surface;

a second actuator which generates a driving force for causing the second travel operation unit to travel at least in the lateral direction; and a control unit, which controls the first actuator and the second actuator so as to cause the first travel operation unit and the second travel operation unit to carry out travel motions thereof according to at least the tilt of the rider mounting section, wherein the control unit is configured to carry out turning control processing, which is control processing for controlling the first actuator and the second actuator such that the travel velocity of the first travel operation unit and the travel velocity of the second travel operation unit in the lateral direction are different from each other in a situation in which the rider on the rider mounting section has shifted his/her center of gravity to the right or left relatively with respect to the rider mounting section (a fifth aspect of the invention).

According to the fifth aspect of the invention, as with the first aspect of the invention, the inverted pendulum type vehicle (hereinafter referred to simply as "the vehicle" in some cases) is provided with, in addition to the first travel operation unit and the first actuator, the second travel operation unit, which is disposed with the interval provided in the longitudinal direction relative to the first travel operation unit and which is capable of traveling in all directions, and a second actuator, which generates the driving force for causing the second travel operation unit to travel in the lateral direction.

As has been described in relation to the first aspect of the invention, when the rider on the rider mounting section intends to turn the vehicle (including the changing of the direction), the rider normally attempts to shift his/her center of gravity to the right or left relatively with respect to the rider mounting section so as to generate a velocity component of the vehicle in the rightward or leftward direction, thereby tilting the rider mounting section. In this case, since the rider mounting section has a tendency to tilt rightward or leftward, the control unit moves the first travel operation unit rightward or leftward to prevent the tilt of the rider mounting section.

Thus, in the situation wherein the rider has shifted his/her center of gravity to the right or left relatively with respect to the rider mounting section, it is very likely that the rider is trying to turn the vehicle.

Hence, according to the fifth aspect of the invention, the control unit carries out the turning control processing, which is the control processing for controlling the first actuator and the second actuator such that the travel velocity of the first travel operation unit and the travel velocity of the second travel operation unit in the lateral direction are different from each other in the situation wherein the rider on the rider mounting section has shifted his/her center of gravity to the right or left relatively with respect to the rider mounting section.

This will turn the vehicle due to the difference between the travel velocity of the first travel operation unit and the travel velocity of the second travel operation unit in the lateral direction.

Thus, the inverted pendulum type vehicle according to the fifth aspect of the invention enables the rider on the rider mounting section to turn the vehicle simply by moving his/her center of gravity to the right or left relatively with respect to the rider mounting section so as to move the first travel operation unit rightward or leftward.

Consequently, the inverted pendulum type vehicle according to the fifth aspect of the invention provides improved maneuverability, permitting easier turning of the vehicle.

Further, the inverted pendulum type vehicle in accordance with the present invention may adopt the following mode. An inverted pendulum type vehicle in accordance with the present invention has at least a first travel operation unit capable of traveling on a floor surface, a first actuator that drives the first travel operation unit, a base body to which the first travel operation unit and the first actuator are installed, and a rider mounting section attached to the base body such that the rider mounting section is tiltable relative to a vertical direction, wherein the first travel operation unit is configured to be capable of traveling in all directions, including a longitudinal direction and a lateral direction relative to a rider on the rider mounting section, by a driving force of the first actuator, the inverted pendulum type vehicle including:

a second travel operation unit, which is connected to the first travel operation unit or the base body with an interval provided from the first travel operation unit in the longitudinal direction and which is configured to be capable of traveling in all directions on a floor surface;

a second actuator which generates a driving force for causing the second travel operation unit to travel at least in the lateral direction;

a control unit, which controls the first actuator and the second actuator so as to cause the first travel operation unit and the second travel operation unit to carry out travel motions thereof according to at least the tilt of the rider mounting section; and a total center of gravity offset estimating unit which estimates a lateral total center of gravity offset amount, which is the amount of a lateral relative movement of the total center of gravity of the rider and the inverted pendulum type vehicle with respect to the rider mounting section, the lateral total center of gravity offset amount being accrued due to the rider on the rider mounting section having shifted his/her center of gravity to the right or left relatively with respect to the rider mounting section, wherein the control unit is configured to carry out turning control processing for controlling the travel velocity of the first travel operation unit and the travel velocity of the second travel operation unit in the lateral direction through the first actuator and the second actuator, respectively, on the basis of a lateral total center of gravity offset amount estimated by the total center of gravity offset estimating unit so as to turn the inverted pendulum type vehicle in a situation in which the rider on the rider mounting section has shifted his/her center of gravity to the right or left relatively with respect to the rider mounting section (a sixth aspect of the invention).

According to the sixth aspect of the invention, as with the fifth aspect of the invention, the inverted pendulum type vehicle (hereinafter referred to simply as "the vehicle" in some cases) is provided with, in addition to the first travel operation unit and the first actuator, the second travel operation unit, which is disposed with the interval provided in the longitudinal direction relative to the first travel operation unit and which is capable of traveling in all directions, and a second actuator, which generates the driving force for causing the second travel operation unit to travel in the lateral direction.

As has been described in the fifth aspect of the invention, in the situation wherein the rider has shifted his/her center of gravity to the right or left relatively with respect to the rider mounting section, it is very likely that the rider is trying to turn the vehicle.

Hence, according to the sixth aspect of the invention, the lateral total center of gravity offset amount is estimated by the total center of gravity offset estimating unit. Then, the control unit carries out the turning control processing for controlling the travel velocity of the first travel operation unit and the travel velocity of the second travel operation unit in the lateral direction through the first actuator and the second actuator, respectively, on the basis of the lateral total center of gravity offset amount estimated by the total center of gravity offset estimating unit so as to turn the inverted pendulum type vehicle in the situation wherein the rider on the rider mounting section has shifted his/her center of gravity to the right or left relatively with respect to the rider mounting section.

This will cause the vehicle to turn.

Thus, as with the fifth aspect of the invention, the inverted pendulum type vehicle according to the sixth aspect of the invention enables the rider on the rider mounting section to turn the vehicle simply by moving his/her center of gravity to the right or left relatively with respect to the rider mounting section so as to move the first travel operation unit rightward or leftward.

Consequently, the inverted pendulum type vehicle according to the sixth aspect of the invention provides improved maneuverability, permitting easier turning of the vehicle.

In the sixth aspect of the invention, the control unit is preferably configured to carry out the turning control processing in a situation, wherein the magnitude of the estimated value of the lateral total center of gravity offset amount is a predetermined value or more, so as to control the first actuator and the second actuator such that the travel velocity of the first travel operation unit and the travel velocity of the second travel operation unit in the lateral direction are the same with each other in a situation wherein the magnitude of the estimated value of the lateral total center of gravity offset amount is smaller than the predetermined value (a seventh aspect of the invention).

According to the seventh aspect of the invention, in the situation wherein the magnitude of the estimated value of the lateral total center of gravity offset amount is smaller than the predetermined value, the first actuator and the second actuator are controlled such that the travel velocity of the first travel operation unit and the travel velocity of the second travel operation unit in the lateral direction are the same with each other.

This arrangement makes it possible to prevent the vehicle from being accidentally turned due to an unintended reel of the body of the rider when the rider does not intend to turn the vehicle. In addition, a translational travel of the vehicle in the lateral direction can be made, as necessary.

Further, in the situation wherein the magnitude of the estimated value of the lateral total center of gravity offset amount is smaller than the predetermined value, the turning control processing is carried out. This enables the rider to easily turn the vehicle simply by explicitly moving his/her center of gravity rightward or leftward when turning the vehicle.

The estimated value of the lateral total center of gravity offset amount can be sequentially calculated by, for example, the operation shown in the block diagram of FIG. 7, which will be discussed hereinafter.

To be more specific, the estimated value of the lateral total center of gravity offset amount can be sequentially determined to converge to an actual value by multiplying the difference between a first estimated value $Vb\_estm1\_y$ and a second estimated value $Vb\_estm2\_y$ of the lateral travel velocity of the total center of gravity of the vehicle and the rider (hereinafter referred to as "the vehicle system total center of gravity" in some cases) by a gain of a predetermined value set beforehand.

In this case, the first estimated value $Vb\_estm1\_y$ is an estimated value of the lateral travel velocity of the vehicle system total center of gravity kinematically calculated according to expression (A) given below. The second estimated value $Vb\_estm2\_y$ is an estimated value of the travel velocity calculated by integrating a lateral travel acceleration $DVb\_estm\_y$ of the vehicle system total center of gravity dynamically calculated according to expression (B) given below.

$$Vb\_estm1\_y = Vw1\_act\_y + h \cdot \omega b\_act\_y \quad (A)$$

$$DVb\_estm\_y = (\theta b\_act\_y \cdot (h-r) + Ofst\_estm\_y(k-1)) \cdot (g/h) + Vb\_estm1\_x \cdot \omega z\_act \quad (B)$$

where
$Vw1\_act\_y$: Observed value of the lateral travel velocity of the first travel operation unit (leftward direction being defined as positive)
h: Value set beforehand as the height of the vehicle system total center of gravity from a floor surface
$\omega b\_act\_y$: Observed value of the angular velocity of a tilt about the longitudinal axis of the rider mounting section (tilting leftward being defined as positive)
$\theta b\_act\_y$: Observed value of a tilt angle (tilt angle relative to the vertical direction) about the longitudinal axis of the rider mounting section (tilting leftward being defined as positive)
r: Height of a tilt center from a floor surface about the longitudinal axis of the rider mounting section (the radius of a roller 7 in an embodiment to be discussed hereinafter)
$Ofst\_estm\_y(k-1)$: Latest value of the estimated value of the lateral total center of gravity offset amount that has been calculated (leftward direction being defined as positive)

g: Gravitational acceleration constant
$Vb\_estm1\_x$: Estimated value of the longitudinal travel velocity of the vehicle system total center of gravity calculated according to expression (C) given below $$Vb\_estm1\_x = Vw1\_act\_x + h \cdot \omega b\_act\_x \quad (C)$$

$Vw1\_act\_x$: Observed value of the longitudinal travel velocity of the first travel operation unit (advancing direction being defined as positive)
$\omega b\_act\_x$: Observed value of the angular velocity of a tilt about the lateral axis of the rider mounting section (tilting forward being defined as positive)
$\omega z\_act$: Angular velocity about a yaw axis of the vehicle (counterclockwise as observed from above being defined as positive)

In the seventh aspect of the invention, the control unit is preferably configured to determine a desired value of a turn angular velocity of the inverted pendulum type vehicle on the basis of at least the estimated value of the lateral total center of gravity offset amount and to control the velocities of the travels of the first travel operation unit and the second travel operation unit in the lateral direction on the basis of the desired value of the turn angular velocity through the intermediary of the first actuator and the second actuator, respectively, in the turning control processing (an eighth aspect of the invention).

According to the eighth aspect of the invention, the desired value of the turn angular velocity of the inverted pendulum type vehicle is determined on the basis of at least the estimated value of the lateral total center of gravity offset amount in the turning control processing. This arrangement enables the rider to change the turning velocity of the vehicle to a desired turning velocity by adjusting the motion of his/her own body in the lateral direction.

In this case, for example, the desired value of the turn angular velocity is preferably determined such that the magnitude of the desired value of the turn angular velocity increases as the magnitude of the estimated value of the lateral total center of gravity offset amount increases.

The desired value of the turn angular velocity is preferably determined such that the magnitude thereof is a predetermined upper limit value or less.

Supplementarily, in the first to the eighth aspects of the invention described above, the second travel operation unit may be disposed either in the front or at the rear of the first travel operation unit.

Regardless of whether the second travel operation unit is disposed at the rear or in front of the first travel operation unit, the lateral travel velocities of the first travel operation unit and the second travel operation unit are preferably controlled through the intermediary of the first actuator and the second actuator, respectively, such that the turning center of the inverted pendulum type vehicle is positioned behind the first travel operation unit in the turning control processing.

DESCRIPTION OF THE PREFERRED EMBODIMENTS

First Embodiment

Figure 1:
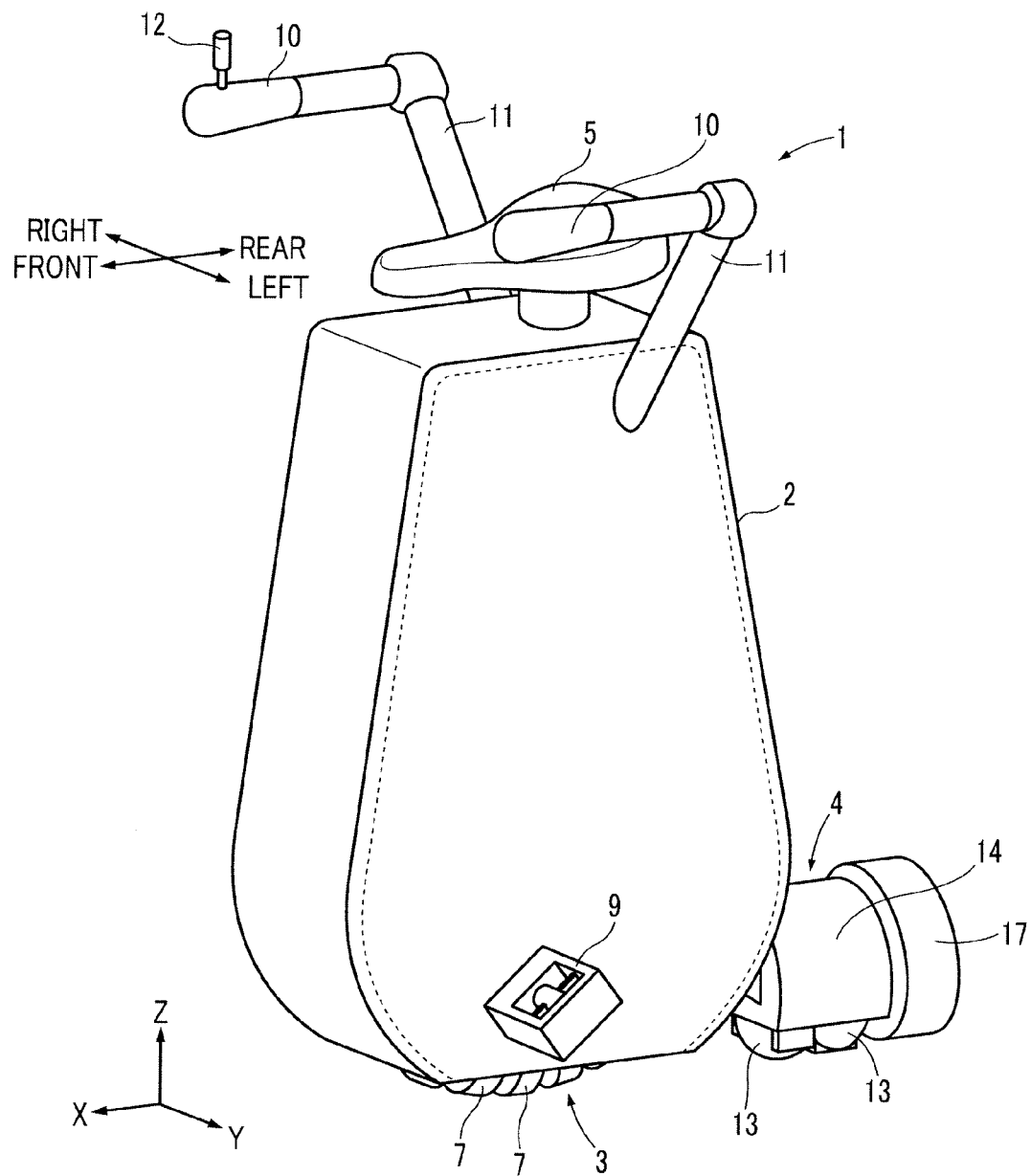
FIG. 1 is a perspective view illustrating the appearance of an inverted pendulum type vehicle according to a first embodiment of the present invention.
Figure 2:
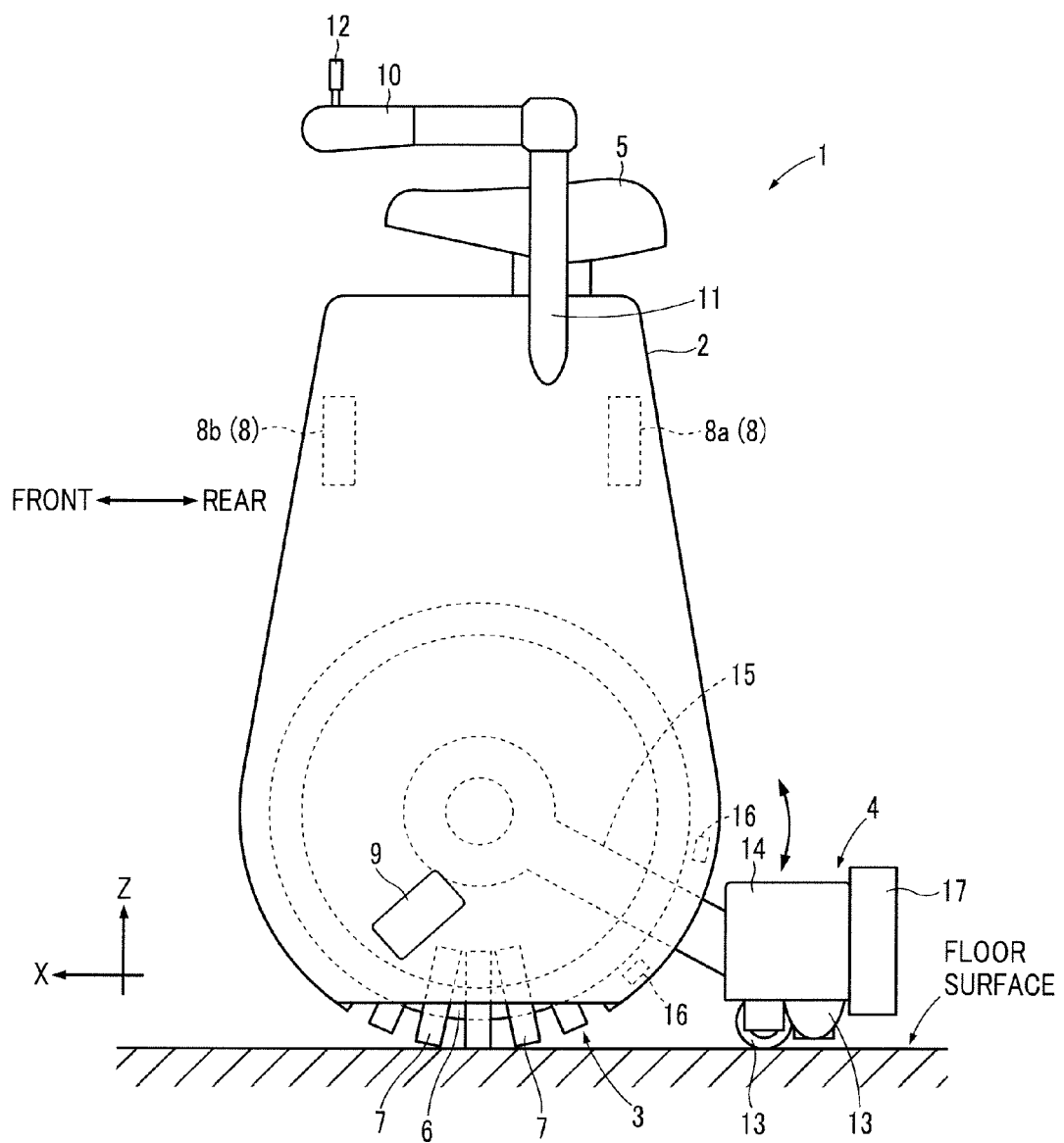
FIG. 2 is a side view of the inverted pendulum type vehicle according to the first embodiment.

A first embodiment of the present invention will be described with reference to FIG. 1 to FIG. 8. As illustrated in FIG. 1 and FIG. 2, an inverted pendulum type vehicle 1 according to the present embodiment (hereinafter referred to simply as the vehicle 1 in some cases) has a base body 2, a first travel operation unit 3 and a second travel operation unit 4, which are capable of traveling on a floor surface, and a rider mounting section 5 on which a rider mounts.

The first travel operation unit 3 includes a circular core member 6 shown in FIG. 2 (hereinafter referred to as the annular core member 6) and a plurality of circular rollers 7 mounted on the annular core member 6 such that the circular rollers 7 are arranged at equiangular intervals in the circumferential direction (in the direction about the axial center) of the annular core member 6. Each of the rollers 7 is externally inserted into the annular core member 6 with its rotational axial center directed toward the circumference of the annular core member 6. Further, each of the rollers 7 is configured to be rotatable integrally with the annular core member 6 about the axial center of the annular core member 6. In addition, each of the rollers 7 is configured to be rotatable about the central axis of the cross-sectional plane of the annular core member 6 (the circumferential axis about the axial center of the annular core member 6).

The first travel operation unit 3 having the annular core member 6 and the plurality of the rollers 7 comes in contact with a floor surface through the intermediary of the rollers 7 (the rollers 7 positioned in a lower portion of the annular core member 6), the axial center of the annular core member 6 being directed in parallel to the floor surface. In this ground contact state, the annular core member 6 is rotatively driven about the axial center thereof so as to cause all the annular core member 6 and the rollers 7 to circumrotate. This in turn causes the first travel operation unit 3 to travel on the floor surface in a direction orthogonal to the axial center of the annular core member 6. In the ground contact state, rotatively driving the rollers 7 about their rotational axial centers causes the first travel operation unit 3 to travel in the direction of the axial center of the annular core member 6.

Further, rotatively driving the annular core member 6 and rotatively driving the rollers 7 cause the first travel operation unit 3 to travel in a direction at an angle with respect to the direction orthogonal to the axial center of the annular core member 6 and the direction of the axial center of the annular core member 6.

Thus, the first travel operation unit 3 is capable of traveling on the floor surface in all directions. In the following description, of the traveling directions of the first travel operation unit 3, the direction orthogonal to the axial center of the annular core member 6 is defined as X-axis direction, the direction of the axial center of the annular core member 6 is defined as Y-axis direction, and a vertical direction is defined as Z-axis direction, as illustrated in FIG. 1 and FIG. 2. In addition, a front direction is defined as the positive direction of the X-axis, a left direction is defined as the positive direction of the Y-axis, and an upper direction is defined as a positive direction of the Z-axis.

The first travel operation unit 3 is installed to the base body 2. More specifically, the base body 2 is provided, covering the first travel operation unit 3 except for a lower portion thereof in contact with the floor surface. Further, the base body 2 supports the annular core member 6 of the first travel operation unit 3 such that the annular core member 6 is rotatable about the axial center thereof.

In this case, the base body 2 uses the axial center of the annular core member 6 of the first travel operation unit 3 as the supporting point thereof and the base body 2 can be tilted about the axial center (about the Y-axis). Further, the base body 2 is tiltable about the X-axis orthogonal to the axial center of the annular core member 6 by tilting together with the first travel operation unit 3 relative to the floor surface, the ground contact portion of the first travel operation unit 3 being the supporting point. Thus, the base body 2 is tiltable about two axes relative to the vertical direction.

The base body 2 includes therein a first actuator 8, which generates a driving force for moving the first travel operation unit 3, as illustrated in FIG. 2. The first actuator 8 is constituted of an electric motor $8a$ serving as the actuator that rotatively drives the annular core member 6 and an electric motor $8b$ serving as the actuator that rotatively drives the rollers 7. The electric motors $8a$ and $8b$ impart rotative driving forces to the annular core member 6 and the rollers 7 through the intermediary of a motive power transmitting mechanisms (not shown). The motive power transmitting mechanisms may have publicly known constructions.

The first travel operation unit 3 may have a construction different from the aforesaid construction. For example, the first travel operation unit 3 and the driving system thereof may adopt the constructions proposed by the applicant of the present application in PCT WO/2008/132778 or PCT WO/2008/132779.

Further, the rider mounting section 5 is installed to the base body 2. The rider mounting section 5 is formed of a seat, on which a rider sits, and fixed to the upper end portion of the base body 2. A rider can sit on the rider mounting section 5, the longitudinal direction thereof being the X-axis direction and the lateral direction thereof being the Y-axis direction. The rider mounting section 5 (the seat) is secured to the base body 2, so that the rider mounting section 5 can be tilted integrally with the base body 2 relative to the vertical direction.

Further attached to the base body 2 are a pair of footrests 9 and 9, on which the rider sitting on the rider mounting section 5 places his/her feet, and a pair of handles 10 and 10 held by the rider.

The footrests 9 and 9 are protrusively provided in lower portions of both sides of the base body 2. In FIG. 1 and FIG. 2, one (the right one) of the footrests 9 is not shown.

The handles 10 and 10 are formed of bar-like members disposed extendedly in the X-axis direction (the longitudinal direction) on both sides of the rider mounting section 5. The handles 10 and 10 are respectively fixed to the base body 2 through rods 11 extended from the base body 2. Further, a joystick 12 serving as an operation device is attached to one handle 10 (the right handle 10 in the drawing) of the pair of handles 10 and 10.

The joystick 12 can be swung in the longitudinal direction (the X-axis direction) and the lateral direction (the Y-axis direction). The joystick 12 outputs an operation signal indicative of the amount of swing in the longitudinal direction (the X-axis direction) and the direction of the swing (forward or backward) as a forward/backward travel command for moving the vehicle 1 forward or backward. The joystick 12 also outputs an operation signal indicative of the amount of swing in the lateral direction (the Y-axis direction) and the direction of the swing (rightward or leftward) as a lateral travel command for moving the vehicle 1 in the lateral direction.

The second travel operation unit 4 in the present embodiment is formed of a so-called omniwheel. The omniwheel constituting the second travel operation unit 4 has a publicly known structure, which includes a pair of coaxial annular core members (not shown) and a plurality of barrel-like rollers 13 rotatably and externally inserted in each of the annular core members with the rotational axial centers thereof oriented in the circumferential direction of the annular core member.

In this case, the second travel operation unit 4 is disposed at the rear of the first travel operation unit 3 with the axial centers of the pair of annular core members thereof oriented in the X-axis direction (the longitudinal direction). Further, the second travel operation unit 4 is in contact with a floor surface through the rollers 13.

The roller 13 of one of the pair of annular core members and the roller 13 of the other thereof are arranged such that the phases thereof are shifted in the peripheral directions of the annular core members. The rollers 13 are further configured such that either the roller 13 of one of the pair of annular core members or the roller 13 of the other thereof comes in contact with the floor surface when the pair of annular core members rotates.

The second travel operation unit 4 constituted of the omniwheel is joined to the base body 2. More specifically, the second travel operation unit 4 is provided with a housing 14 that covers an upper portion of the omniwheel (all the pair of annular core members and the plurality of the rollers 13). The pair of annular core members of the omniwheel is rotatably supported by the housing 14 such that the pair of annular core members is rotatable about the axial centers thereof. Further, an arm 15 extended from the housing 14 to the base body 2 is rotatably supported by the base body 2 such that the arm 15 is swingable about the axial center of the annular core member 6 of the first travel operation unit 3. Thus, the second travel operation unit 4 is joined to the base body 2 through the arm 15.

Further, the second travel operation unit 4 is swingable, relative to the base body 2, about the axial center of the annular core member 6 of the first travel operation unit 3 by the swing of the arm 15. This allows the rider mounting section 5 to tilt together with the base body 2 about the Y-axis while maintaining both the first travel operation unit 3 and the second travel operation unit 4 to be in contact with the ground.

Alternatively, the arm 15 may be rotatably supported by the axial center portion of the annular core member 6 of the first travel operation unit 3, and the second travel operation unit 4 may be joined to the first travel operation unit 3 through the arm 15.

The base body 2 is provided with a pair of stoppers 16 and 16 that restricts the swing range of the arm 15. Hence, the arm 15 is allowed to swing within the range defined by the stoppers 16 and 16. This restricts the swing range of the second travel operation unit 4 about the axial center of the annular core member 6 of the first travel operation unit 3 and consequently the range of tilt of the base body 2 and the rider mounting section 5 about the X-axis. As a result, the base body 2 and the rider mounting section 5 are prevented from excessively tilting toward the rear side of the rider.

The second travel operation unit 4 may be urged by a spring so as to be pressed against the floor surface.

As described above, the second travel operation unit 4 is capable of traveling on the floor surface in all directions, including the X-axis direction and the Y-axis direction, as with the first travel operation unit 3, by rotating one or both of the pair of annular core members and the rollers 13. More specifically, the rotation of the annular core members enables the second travel operation unit 4 to travel in the Y-axis direction, i.e., the lateral direction. Further, the rotation of the rollers 13 enables the second travel operation unit 4 to travel in the X-axis direction, i.e., the longitudinal direction.

An electric motor 17 serving as the second actuator, which drives the second travel operation unit 4, is attached to the housing 14 of the second travel operation unit 4. The electric motor 17 is joined to the pair of annular core members so as to rotatively drive the pair of annular core members of the second travel operation unit 4.

Thus, according to the present embodiment, the travel of the second travel operation unit 4 in the X-axis direction is adapted to passively follow the travel of the first travel operation unit 3 in the X-axis direction. Further, the travel of the second travel operation unit 4 in the Y-axis direction is implemented by rotatively driving the pair of annular core members of the second travel operation unit 4 by the electric motor 17.

Supplementarily, the second travel operation unit 4 may have the same construction as that of the first travel operation unit 3.

The above has described the mechanical configuration of the vehicle 1 according to the present embodiment.

Figure 3:
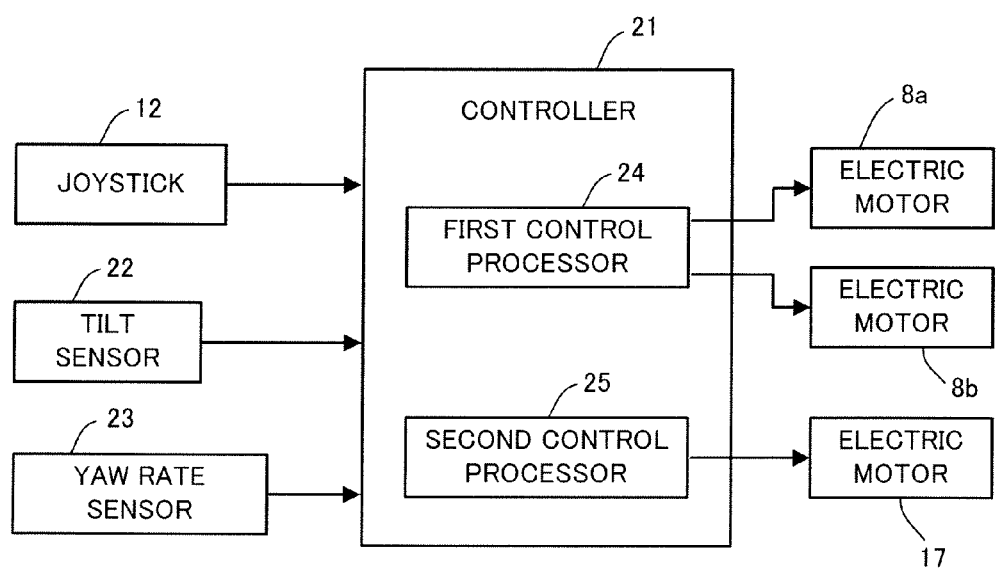
FIG. 3 is a block diagram illustrating the configuration for controlling the inverted pendulum type vehicle according to the first embodiment.

Although not shown in FIG. 1 and FIG. 2, in order to control the operation of the vehicle 1, i.e., to control the operations of the first travel operation unit 3 and the second travel operation unit 4, the base body 2 of the vehicle 1 in the present embodiment incorporates a controller 21 constituted of an electronic circuit unit, which includes a CPU, a RAM, a ROM and the like, a tilt sensor 22 for measuring the tilt angle of the rider mounting section 5 (the tilt angle of the base body 2) relative to the vertical direction, and a yaw rate sensor 23 for measuring the angular velocity of the vehicle 1 about the yaw axis, as illustrated in FIG. 3.

The controller 21 corresponds to the controlling means in the present invention. The controller 21 receives the outputs of the joystick 12 and detection signals of the tilt sensor 22 and the yaw rate sensor 23.

The controller 21 may alternatively be constituted of a plurality of electronic circuit units adapted to communicate with each other.

The tilt sensor 22 is constituted of, for example, an acceleration sensor and an angular velocity sensor, such as a gyro sensor. The controller 21 uses a publicly known method to acquire the measurement value of the tilt angle of the rider mounting section 5, i.e., the tilt angle of the base body 2, from the detection signals of the acceleration sensor and the angular velocity sensor. As the method, the one proposed by the applicant of the present application in, for example, Japanese Patent No. 4181113 may be used.

More specifically, the tilt angle of the rider mounting section 5 (or the tilt angle of the base body 2) in the present embodiment is the tilt angle (a set of a tilt angle in the direction about the X-axis and a tilt angle in the direction about the Y-axis), which uses, as its reference (zero), the posture of the rider mounting section 5 (or the base body 2) in a state wherein the center of gravity of the combination of the vehicle 1 and the rider mounted on the rider mounting section 5 in a predetermined posture (standard posture) is positioned right above the ground contact portion of the first travel operation unit 3 (upward in the vertical direction).

The yaw rate sensor 23 is composed of an angular velocity sensor, such as a gyro sensor. Based on a detection signal of the yaw rate sensor 23, the controller 21 acquires the measurement value of the angular velocity of the vehicle 1 about the yaw axis.

To provide a function implemented by an installed program or the like (a function implemented by software) or a function implemented by hardware in addition to the function for acquiring the measurement values as described above, the controller 21 further includes a first control processor 24, which controls the electric motors 8a and 8b constituting the first actuator 8 thereby to control the traveling motion of the first travel operation unit 3, and a second control processor 25, which controls the electric motor 17 serving as the second actuator thereby to control the traveling motion of the second travel operation unit 4.

The first control processor 24 carries out the arithmetic processing, which will be discussed hereinafter, to sequentially calculate a first desired velocity, which is the desired value of the travel velocity (more specifically, the set of a translational velocity in the X-axis direction and a translational velocity in the Y-axis direction) of the first travel operation unit 3. Then, the first control processor 24 controls the rotational speed of each of the electric motors 8a and 8b thereby to match the actual travel velocity of the first travel operation unit 3 to the first desired velocity.

In this case, the relationship between the rotational speed of each of the electric motors 8a and 8b and the actual travel velocity of the first travel operation unit 3 is established beforehand. Hence, the desired value of the rotational speed of each of the electric motors 8a and 8b is specified on the basis of the first desired velocity of the first travel operation unit 3. Then, the rotational speeds of the electric motors 8a and 8b are feedback-controlled to the desired values specified on the basis of the first desired velocity, thereby controlling the actual travel velocity of the first travel operation unit 3 to the first desired velocity.

Further, the second control processor 25 carries out the arithmetic processing, which will be discussed hereinafter, to sequentially calculate a second desired velocity, which is the desired value of the travel velocity (more specifically, the translational velocity in the Y-axis direction) of the second travel operation unit 4. Then, the second control processor 25 controls the rotational speed of the electric motor 17 thereby to match the actual travel velocity of the second travel operation unit 4 in the Y-axis direction to the second desired velocity.

In this case, the relationship between the rotational speed of the electric motor 17 and the actual travel velocity of the second travel operation unit 4 in the Y-axis direction is established beforehand, as with the case of the first travel operation unit 3. Hence, the desired value of the rotational speed of the electric motor 17 is specified on the basis of the second desired velocity of the second travel operation unit 4. Then, the rotational speed of the electric motor 17 is feedback-controlled to the desired values specified on the basis of the second desired velocity, thereby controlling the actual travel velocity of the second travel operation unit 4 in the Y-axis direction to the second desired velocity.

Supplementarily, according to the present embodiment, the travel of the second travel operation unit 4 in the X-axis direction is passively implemented by following the travel of the first travel operation unit 3 in the X-axis direction. Hence, there is no need to set the desired value of the travel velocity of the second travel operation unit 4 in the X-axis direction.

The processing by the first control processor 24 and the second control processor 25 will now be described in further detail. First, the processing by the first control processor 24 will be described with reference to FIG. 4 to FIG. 7.

Figure 4:
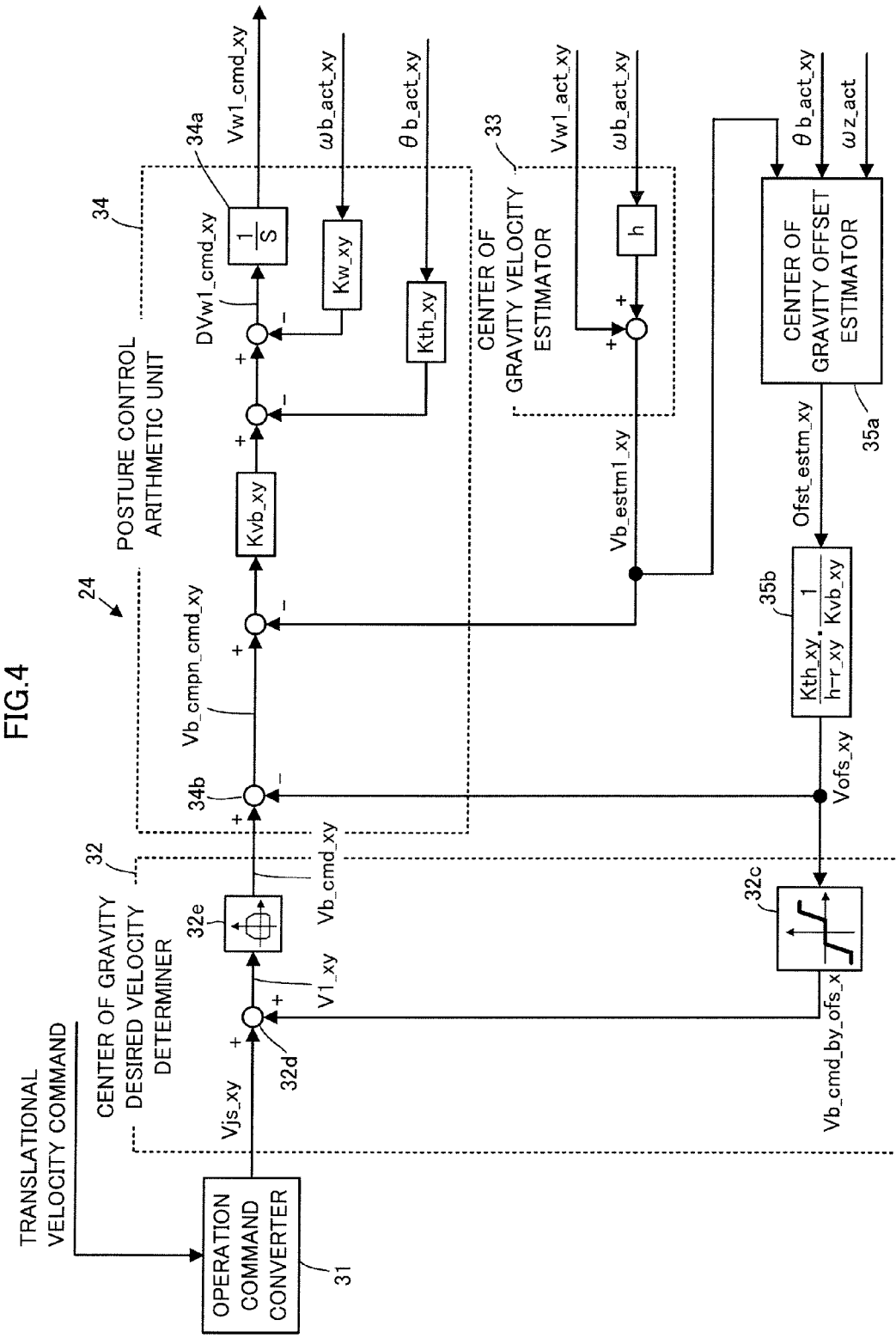
FIG. 4 is a block diagram illustrating the processing by a first control processor shown in FIG. 3.

As illustrated in FIG. 4, the first control processor 24 has, as major functional units thereof, an operation command converter 31, which converts commands (the turning command and the forward/backward command) received from the joystick 12 into velocity commands in the X-axis direction (the longitudinal direction) and the Y-axis direction (the lateral direction) of the vehicle 1, a center of gravity desired velocity determiner 32, which determines the desired velocity of the total center of gravity of the combination of the vehicle 1 and the rider on the rider mounting section 5 (hereinafter referred to as the vehicle system total center of gravity), a center of gravity velocity estimator 33 which estimates the velocity of the vehicle system total center of gravity, and a posture control arithmetic unit 34 which determines the desired value of the travel velocity of the first travel operation unit 3 to control the posture of the rider mounting section 5, i.e., the posture of the base body 2, while making the estimated velocity of the vehicle system total center of gravity follow the desired velocity. The first control processor 24 carries out the processing by the aforesaid functional units at a predetermined arithmetic processing cycle of the controller 21.

In the present embodiment, the vehicle system total center of gravity has a meaning as an example of the representative point of the vehicle 1. Accordingly, the velocity of the vehicle system total center of gravity has a meaning as the travel velocity of the representative point of the vehicle 1.

Before specifically describing the processing carried out by each of the functional units of the first control processor 24, the basic matters of the processing will be described. The dynamic behavior of the vehicle system total center of gravity (more specifically, the behavior observed from the Y-axis direction and the behavior observed from the X-axis direction) is approximately expressed by an inverted pendulum model shown in FIG. 5. The algorithm of the processing by the first control processor 24 is created on the basis of the behavior.

In the following description and FIG. 5, a suffix "_x" means a reference code of a variable or the like observed from the Y-axis direction, while a suffix "_y" means a reference code of a variable or the like observed from the X-axis direction. Further, in FIG. 5, the reference codes of the variables observed from the Y-axis direction are not parenthesized, while the reference codes of the variables observed from the X-axis direction are parenthesized in order to illustrate both an inverted pendulum model observed from the Y-axis direction and an inverted pendulum model observed from the X-axis direction.

The inverted pendulum model expressing the behavior of the vehicle system total center of gravity observed from the Y-axis direction has a virtual wheel 61_x which has a rotational axial center parallel to the Y-axis direction and which is circumrotatable on a floor surface (hereinafter referred to as "the virtual wheel 61_x"), a rod 62_x which is extended from the rotational center of the virtual wheel 61_x and which is swingable about the rotational axis of the virtual wheel 61_x (in the direction about the Y-axis direction), and a mass point Ga_x connected to a reference portion Ps_x, which is the distal end portion (upper end portion) of the rod 62_x.

In the inverted pendulum model, it is assumed that the movement of the mass point Ga_x corresponds to the movement of the vehicle system total center of gravity observed from the Y-axis direction, and a tilt angle θb_x (the angle of a tilt in the direction about the Y-axis) of the rod 62_x relative to the vertical direction agrees with the angle of a tilt of the rider mounting section 5 (or the base body 2) in the direction about the Y-axis. Further, the translational movement of the first travel operation unit 3 in the X-axis direction corresponds to the translational movement in the X-axis direction by the circumrotation of the virtual wheel 61_x.

Further, a radius r_x of the virtual wheel 61_x and a height h_x of each of the reference portion Ps_x and the mass point Ga_x from the floor surface are set to predetermined values (fixed values) set beforehand. The radius r_x corresponds, in other words, to the height of the center of the tilt of the rider mounting section 5 (or the base body 2) in the direction about the Y-axis from a floor surface. In the present invention, the r_x corresponds to the distance between the central axis of the annular core member 6 of the first travel operation unit 3 and the ground contact surface.

Similarly, the inverted pendulum model expressing the behavior of the vehicle system total center of gravity observed from the X-axis direction has a virtual wheel 61_y which has a rotational axial center parallel to the X-axis direction and which is circumrotatable on the floor surface (hereinafter referred to as "the virtual wheel 61_y"), a rod 62_y which is extended from the rotational center of the virtual wheel 61_y and which is swingable about the rotational axis of the virtual wheel 61_y (in the direction about the X-axis direction), and a mass point Ga_y connected to a reference portion Ps_y, which is the distal end portion (upper end portion) of the rod 62_y.

In the inverted pendulum model, it is assumed that the movement of the mass point Ga_y corresponds to the movement of the vehicle system total center of gravity observed from the X-axis direction. Further, a tilt angle θb_y (the angle of a tilt in the direction about the X-axis) of the rod 62_y relative to the vertical direction agrees with the angle of a tilt of the rider mounting section 5 (or the base body 2) in the direction about the X-axis. Further, the translational movement of the first travel operation unit 3 in the Y-axis direction corresponds to the translational movement in the Y-axis direction by the circumrotation of the virtual wheel 61_y.

Further, a radius r_y of the virtual wheel 61_y and a height h_y of each of the reference portion Ps_y and the mass point Ga_y from the floor surface are set to predetermined values (fixed values) set beforehand. The radius r_y corresponds, in other words, to the height of the center of the tilt of the rider mounting section 5 (or the base body 2) in the direction about the X-axis from the floor surface. In the present invention, the r_y corresponds to the radius of each of the rollers 7 of the first travel operation unit 3. Further, the height h_y of each of the reference portion Ps_y and the mass point Ga_y from the floor surface observed in the X-axis direction is the same as the height h_x of each of the reference portion Ps_x and the mass point Ga_x from the floor surface observed in the Y-axis direction. Hereinafter, therefore, h_x=h_y=h will apply.

The positional relationship between the reference portion Ps_x and the mass point Ga_x observed from the Y-axis direction will be supplementarily described. The position of the reference portion Ps_x corresponds to the position of the vehicle system total center of gravity in the case where it is assumed that the rider mounting (sitting) on the rider mounting section 5 is motionless relative to the rider mounting section 5. In this case, therefore, the position of the mass point Ga_x agrees with the position of the reference portion Ps_x. The same applies to the positional relationship between the reference portion Ps_y and the mass point Ga_y observed from the X-axis direction.

In practice, however, when the rider on the rider mounting section 5 moves his/her upper body or the like relative to the rider mounting section 5 (or the base body 2), the positions of the actual vehicle system total center of gravity in the X-axis direction and the Y-axis direction will usually shift from the positions of the reference portions Ps_x and Ps_y, respectively, in the horizontal direction. For this reason, the positions of the mass points Ga_x and Ga_y, which are shown in FIG. 5, are shifted from the positions of the reference portions Ps_x and Ps_y, respectively.

The behavior of the vehicle system total center of gravity represented by the inverted pendulum model described above is denoted by the following expressions (1a), (1b), (2a) and (2b). In this case, expressions (1a) and (1b) denote the behaviors observed in the Y-axis direction, while expressions (2a) and (2b) denote the behaviors observed in the X-axis direction.

$$Vb\_x = Vw1\_x + h \cdot \omega b\_x \quad (1a)$$

$$dVb\_x/dt = (g/h) \cdot (\theta b\_x \cdot (h - r\_x) + \text{Ofst}\_x) + \omega z \cdot Vb\_y \quad (1b)$$

$$Vb\_y = Vw1\_y + h \cdot \omega b\_y \quad (2a)$$

$$dVb\_y/dt = (g/h) \cdot (\theta b\_y \cdot (h - r\_y) + \text{Ofst}\_y) - \omega z \cdot Vb\_x \quad (2b)$$

where Vb_x denotes the velocity of the vehicle system total center of gravity in the X-axis direction (the translational velocity); Vw1_x denotes the moving velocity (the translational velocity) of the virtual wheel 61_x in the X-axis direction; θb_x denotes the tilt angle of the rider mounting section 5 (or the base body 2) in the direction about the Y-axis; ωb_x denotes the temporal change rate of θb_x (=dθb_x/dt); Ofst_x denotes the amount of a shift of the position of the vehicle system total center of gravity in the X-axis direction (the position of the mass point Ga_x in the X-axis direction) from the position of the reference portion Ps_x in the X-axis direction; Vb_y denotes the velocity of the vehicle system total center of gravity in the Y-axis direction (the translational velocity); Vw1_y denotes the moving velocity (the translational velocity) of the virtual wheel 61_y in the Y-axis direction; θb_y denotes the tilt angle of the rider mounting section 5 (or the base body 2) in the direction about the X-axis; ωb_y denotes the temporal change rate of θb_y (=dθb_y/dt); and Ofst_y denotes the amount of shift of the position of the vehicle system total center of gravity in the Y-axis direction (the position of the mass point Ga_y in the Y-axis direction) from the position of the reference portion Ps_y in the Y-axis direction. Further, ωz denotes a yaw rate (the angular velocity in the direction about the yaw axis) when the vehicle 1 turns, and g denotes a gravitational acceleration constant. The positive direction of θb_x and ωb_x is the direction in which the vehicle system total center of gravity tilts in the positive direction of the X-axis (forward), while the positive direction of θb_y and ωb_y is the direction in which the vehicle system total center of gravity tilts in the positive direction of the Y-axis (leftward). Further, the positive direction of ωz is the counterclockwise direction as the vehicle 1 is observed from above.

Vb_x and Vb_y coincide with the travel velocity of the reference portion Ps_x in the X-axis direction and the travel velocity of the reference portion Ps_y in the Y-axis direction, respectively.

The second term of the right side of expression (1a), namely, (=h·ωb_x), denotes the translational velocity component of the reference portion Ps_x in the X-axis direction generated by a tilt of the rider mounting section 5 in the direction about the Y-axis. The second term of the right side of expression (2a), namely, (=h·ωb_y), denotes the translational velocity component of the reference portion Ps_y in the Y-axis direction generated by a tilt of the rider mounting section 5 in the direction about the X-axis.

Supplementarily, Vw1_x in expression (1a) specifically denotes a relative circumferential velocity of the virtual wheel 61_x with respect to the rod 62_x (in other words, with respect to the rider mounting section 5 or the base body 2). Hence, Vw1_x includes a velocity component (=r_x·ωb_x), which is generated when the rod 62_x tilts, in addition to the moving velocity of the ground contact point of the virtual wheel 61_x in the X-axis direction relative to the floor surface, i.e., the moving velocity of the ground contact point of the first travel operation unit 3 in the X-axis direction relative to the floor surface. The same applies to Vw1_y in expression (1b).

Further, the first term of the right side of expression (1b) denotes an acceleration component in the X-axis direction generated at the vehicle system total center of gravity by a component in the X-axis direction (F_x in FIG. 5) of a floor reaction force (F in FIG. 5) acting on the ground contact portion of the virtual wheel 61_x according to the amount of shift (=θb_x·(h−r_x)+Ofst_x) of the position of the vehicle system total center of gravity in the X-axis direction (the position of the mass point Ga_x in the X-axis direction) from the vertical upper position of the ground contact portion of the virtual wheel 61_x (the ground contact portion of the first travel operation unit 3 observed from the Y-axis direction). The second term of the right side of expression (1b) denotes the acceleration component in the X-axis direction generated by a centrifugal force acting on the vehicle 1 at the time of turning at the yaw rate of ωz.

Similarly, the first term of the right side of expression (2b) denotes an acceleration component in the Y-axis direction generated at the vehicle system total center of gravity by a component in the Y-axis direction (F_y in FIG. 5) of a floor reaction force (F in FIG. 5) acting on the ground contact portion of the virtual wheel 61_y according to the amount of deviation (=θb_y·(h−r_y)+Ofst_y) of the position of the vehicle system total center of gravity in the Y-axis direction (the position of the mass point Ga_y in the Y-axis direction) from the vertical upper position of the ground contact portion of the virtual wheel 61_y (the ground contact portion of the first travel operation unit 3 observed from the X-axis direction). The second term of the right side of expression (2b) denotes the acceleration component in the Y-axis direction generated by a centrifugal force acting on the vehicle 1 at the time of turning at the yaw rate of ωz.

Figure 6:
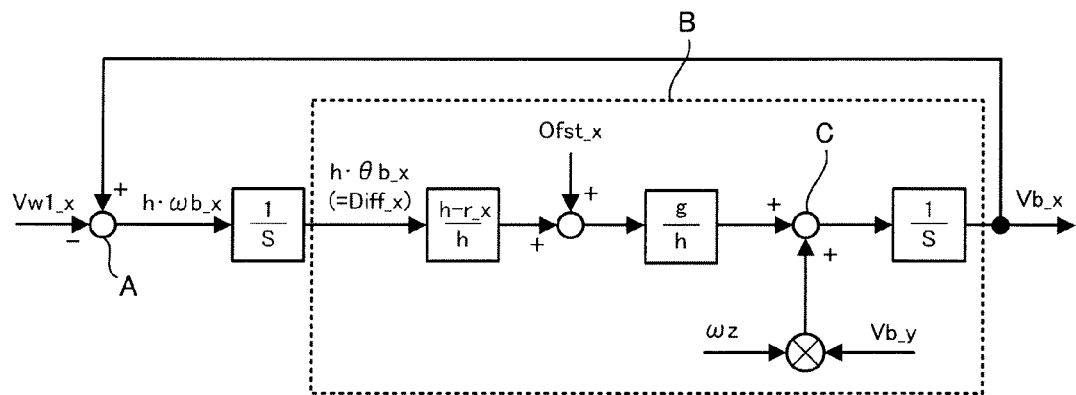
FIG. 6 is a block diagram illustrating behaviors related to the inverted pendulum model shown in FIG. 5.

The behaviors (the behaviors observed in the X-axis direction) represented by expressions (1a) and (1b) described above are illustrated by the block diagram of FIG. 6. In the diagram, 1/s denotes integration operation.

Further, the processing by an arithmetic unit indicated by reference character A in FIG. 6 corresponds to the relational expression of expression (1a), while the processing by an arithmetic unit indicated by reference character B corresponds to the relational expression of expression (1b).

Figure 5:
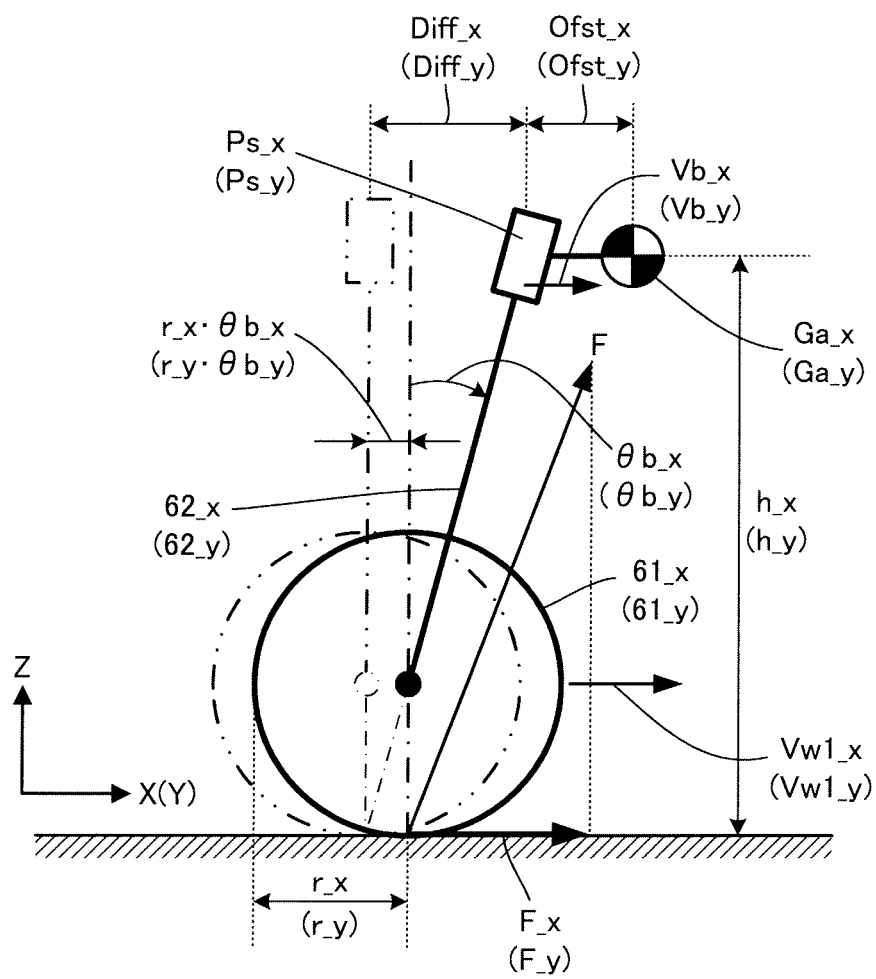
FIG. 5 is a diagram illustrating an inverted pendulum model used for the processing by the first control processor shown in FIG. 3.

In FIG. 6, h·θb_x approximately coincides with Diff_x shown in FIG. 5.

Meanwhile, the block diagram representing the behaviors indicated by expressions (2a) and (2b), i.e., the behaviors observed in the Y-axis direction, is obtained by replacing the suffix "_x" in FIG. 6 by "_y" and by replacing the sign "+" of the acceleration component (the acceleration component generated by the centrifugal force) at the lower side in the drawing, which is one of the inputs to an adder denoted by reference character C, by "−."

According to the present embodiment, the algorithm of the processing by the first control processor 24 is created on the basis of the behavior model (inverted pendulum model) of the vehicle system total center of gravity that considers the centrifugal force and the amount of the shift of the vehicle system total center of gravity from the reference portions Ps_x and Ps_y, as described above.

Based on the above, the processing by the first control processor 24 will be specifically described. In the following description, the set of the value of a variable related to the behavior observed from the Y-axis direction and the value of a variable related to the behavior observed from the X-axis direction will be denoted by adding a suffix "_xy" in some cases.

Referring to FIG. 4, the first control processor 24 first carries out the processing by the operation command converter 31 and the processing by the center of gravity velocity estimator 33 at each arithmetic processing cycle of the controller 21.

The operation command converter 31 determines a basic velocity command Vjs_xy, which is the basic command value of the travel velocity (the translational velocity) of the first travel operation unit 3 on the basis of the forward/backward command (the operation signal indicative of the amount of swing of the joystick 12 in the X-axis direction and the direction of the swing) or the lateral travel command (the operation signal indicative of the amount of swing of the joystick 12 in the Y-axis direction and the direction of the swing) received from the joystick 12.

In this case, of the aforesaid basic velocity command Vjs_xy, the basic velocity command Vjs_x in the X-axis direction is determined according to the forward/backward command. More specifically, if the amount of the swing of the joystick 12 indicated by the forward/backward command is the amount of a forward swing, then the basic velocity command in the X-axis direction Vjs_x will be a velocity command for a forward movement direction of the vehicle 1. If the amount of swing of the joystick 12 is the amount of a backward swing, then the basic velocity command in the X-axis direction Vjs_x will be a velocity command for a backward movement direction of the vehicle 1. In this case, the magnitude of the basic velocity command in the X-axis direction Vjs_x is determined such that it increases to a predetermined upper limit value or less as the magnitude of the amount of swing of the joystick 12 in the forward or the backward direction increases.

A predetermined range in which the amount of the forward or backward swing of the joystick 12 is sufficiently small may be defined as a dead zone, and the basic velocity command in the X-axis direction Vjs_x may be set to zero for a swing amount in the dead zone.

Of the basic velocity commands Vjs_xy, the basic velocity command in the Y-axis direction Vjs_y is determined according to the lateral travel command. More specifically, if the swing amount of the joystick 12 indicated by the lateral travel command is a rightward swing amount, then the basic velocity command in the Y-axis direction Vjs_y is defined as the rightward velocity command for the vehicle 1. If the swing amount of the joystick 12 is a leftward swing amount, then the basic velocity command in the Y-axis direction Vjs_y is defined as the leftward velocity command for the vehicle 1. In this case, the magnitude of the basic velocity command in the Y-axis direction Vjs_y is determined such that it increases to a predetermined upper limit value or less as the rightward or leftward swing amount of the joystick 12 increases.

Regarding the magnitude of the basic velocity command Vjs_y, a predetermined range in which the amount of the rightward or leftward swing of the joystick 12 is sufficiently small may be defined as a dead zone, and the basic velocity command in the Y-axis direction Vjs_y may be set to zero for a swing amount in the dead zone.

If the joystick 12 is operated in both the longitudinal direction (X-axis direction) and the Y-axis direction (the lateral direction), then the magnitude of the basic velocity command in the Y-axis direction Vjs_y may be set so as to change according to the swing amount of the joystick 12 in the longitudinal direction or the basic velocity command in the X-axis direction Vjs_x.

The center of gravity velocity estimator 33 calculates an estimated value of the velocity of the vehicle system total center of gravity Vb_estm1_xy according to the geometric (kinematic) relationship expressions given by the aforesaid expressions (1a) and (2a) in the inverted pendulum model.

More specifically, as illustrated by the block diagram in FIG. 4, the center of gravity velocity estimator 33 adds up the value of an actual translational velocity Vw1_act_xy of the first travel operation unit 3 and the value, which is obtained by multiplying an actual temporal change rate (tilt angular velocity) ωb_act_xy of a tilt angle θb_xy of the rider mounting section 5 by a height h of the vehicle system total center of gravity to calculate the estimated value of the velocity of the vehicle system total center of gravity Vb_estm1_xy.

More specifically, the estimated value of the velocity in the X-axis direction Vb_estm1_x of the vehicle system total center of gravity and the estimated value of the velocity in the Y-axis direction Vb_estm1_y thereof are calculated according to the following expressions (3a) and (3b).

$$Vb\_estm1\_x = Vw1\_act\_x + h \cdot \omega b\_act\_x \quad (3a)$$

$$Vb\_estm1\_y = Vw1\_act\_y + h \cdot \omega b\_act\_y \quad (3b)$$

However, the temporal change rate of the offset amount Ofst_xy of the position of the vehicle system total center of gravity from the position of the reference portion Ps_xy (hereinafter referred to as the center of gravity offset amount Ofst_xy) is set to be sufficiently smaller than Vb_estm1_xy so as to be ignorable.

In this case, according to the present embodiment, desired values of the travel velocity Vw1_cmd_x and Vw1_cmd_y (previous values) of the first travel operation unit 3 determined by the posture control arithmetic unit 34 at the previous arithmetic processing cycle are used as the values of Vw1_act_x and Vw1_act_y in the above calculation.

Alternatively, however, the rotational speeds of the electric motors 8a and 8b, for example, may be detected by a rotational velocity sensor, such as a rotary encoder. Then, the latest values of Vw1_act_x and Vw1_act_y (i.e., the latest values of the measurement values of Vw1_act_x and Vw1_act_y) estimated from the detection values may be used for the calculation of expressions (3a) and (3b).

Further, according to the present embodiment, the latest values of the temporal change rates of the measurement values of the tilt angle θb of the rider mounting section 5 based on a detection signal of the tilt sensor 22 (i.e., the latest values of the measurement values of ωb_act_x and ωb_act_y) are used as the values of ωb_act_x and ωb_act_y.

After carrying out the processing by the operation command converter 31 and the center of gravity velocity estimator 33 as described above, the first control processor 24 carries out the processing by a center of gravity offset estimator 35a illustrated in FIG. 4. Thus, the first control processor 24 determines a center of gravity offset amount estimated value Ofst_estm_xy, which is the estimated value of the center of gravity offset amount Ofst_xy.

Figure 7:
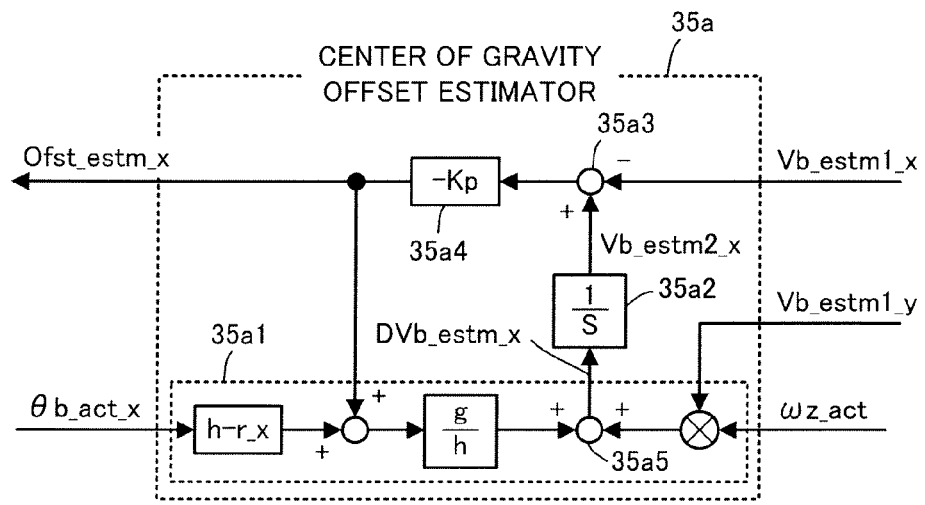
FIG. 7 is a block diagram illustrating the processing by a center of gravity offset estimator shown in FIG. 4.

The processing by the center of gravity offset estimator 35a is the processing indicated by the block diagram of FIG. 7. FIG. 7 representatively illustrates the processing for determining the estimated value of the center of gravity offset amount in the X-axis direction Ofst_estm_x of the estimated value of the center of gravity offset amount Ofst_estm_xy.

The processing in FIG. 7 will be specifically described. The center of gravity estimator 35a carries out the arithmetic processing of the right side of the aforesaid expression (1b) by an arithmetic unit 35a1 by using a measurement value (a latest value) of an actual tilt angle in the direction about the Y-axis θb_act_x of the rider mounting section 5 obtained from a detection signal of the tilt sensor 22, a measurement value (a latest value) of an actual yaw rate ωz_act of the vehicle 1 obtained from a detection signal of the yaw rate sensor 23, a first estimated value (a latest value) of the velocity of the vehicle system total center of gravity in the Y-axis direction Vb_estm1_y calculated by the center of gravity velocity estimator 33, and the estimated value of the center of gravity offset amount in the X-axis direction Ofst_estm_x (a previous value) determined at the previous arithmetic processing cycle. Thus, the center of gravity offset estimator 35a calculates an estimated value of the translational acceleration of the vehicle system total center of gravity in the X-axis direction DVb_estm_x.

The center of gravity offset estimator 35a further carries out the processing for integrating the estimated value of the translational acceleration in the X-axis direction DVb_estm_x of the vehicle system total center of gravity by an arithmetic unit 35a2. Thus, the center of gravity offset estimator 35a calculates a second estimated value of the velocity of the vehicle system total center of gravity in the X-axis direction Vb_estm2_x.

Subsequently, the center of gravity offset estimator 35a carries out the processing for calculating the difference between the second estimated value of the velocity of the vehicle system total center of gravity in the X-axis direction Vb_estm2_x (a latest value) and the first estimated value Vb_estm1_x (a latest value) thereof by an arithmetic unit 35a3.

Then, the center of gravity offset estimator 35a further carries out the processing for multiplying the difference by a gain (−Kp) of a predetermined value by an arithmetic unit 35a4. Thus, the center of gravity offset estimator 35a determines the latest value of the estimated value of the center of gravity offset amount in the X-axis direction Ofst_estm_x.

The processing for determining the estimated value of the center of gravity offset amount in the Y-axis direction Ofst_estm_y is also carried out in the same manner described above. More specifically, the block diagram illustrating the determination processing can be obtained by replacing the suffix "_x" in FIG. 7 by "_y" and by replacing the sign "+" of the acceleration component (an acceleration component generated by a centrifugal force) at right in the drawing, which is one of the inputs to an adder 35a5, by "−".

The estimated value of the center of gravity offset amount Ofst_estm_xy is determined while being updated by the aforesaid processing carried out by the center of gravity offset estimator 35a. This makes it possible to converge Ofst_estm_xy to an actual value.

The first control processor 24 then carries out the processing by a center of gravity offset influence amount calculator 35b shown in FIG. 4 to calculate a center of gravity offset influence amount Vofs_xy.

The center of gravity offset influence amount Vofs_xy indicates the deviation of an actual center of gravity velocity from a desired velocity of the vehicle system total center of gravity in the case where the feedback control is conducted in the posture control arithmetic unit 34, which will be discussed hereinafter, without considering the deviation of the position of the vehicle system total center of gravity from the position of the reference portion Ps_xy in the inverted pendulum mode.

To be specific, the center of gravity offset influence amount calculator 35b multiplies each component of a newly determined estimated value of the center of gravity offset amount Ofst_estm_xy by a value denoted by (Kth_xy/(h_r_xy))/Kvb_xy, thereby calculating the center of gravity offset influence amount Vofs_xy.

Kth_xy denotes a gain value for determining a manipulated variable component which functions to bring the tilt angle of the rider mounting section 5 close to zero, i.e., to a desired tilt angle, in the processing by the posture control arithmetic unit 34, which will be hereinafter discussed. Further, Kvb_xy denotes a gain value for determining a manipulated variable component which functions to bring the difference between a desired velocity of the vehicle system total center of gravity Vb_cmd_xy and the first estimated value of the velocity of the vehicle system total center of gravity Vb_estm1_xy close to zero in the processing carried out by the posture control arithmetic unit 34, which will be hereinafter discussed.

The first control processor 24 then carries out the processing by the center of gravity desired velocity determiner 32 shown in FIG. 4. Thus, the first control processor 24 calculates a restricted center of gravity desired velocity Vb_cmd_xy on the basis of the basic velocity command Vjs_xy determined by the operation command converter 31 and the center of gravity offset influence amount Vofs_xy determined by the center of gravity offset influence amount calculator 35b.

The center of gravity desired velocity determiner 32 first carries out the processing through a processor 32c shown in FIG. 4. The processor 32c carries out dead-zone processing and limiting related to the value of the center of gravity offset influence amount Vofs_xy thereby to determine a desired center of gravity velocity additive amount Vb_cmd_by_ofs_xy as a component based on the center of gravity offset of a desired value of the vehicle system total center of gravity.

More specifically, according to the present embodiment, if the magnitude of the center of gravity offset influence amount in the X-axis direction Vofs_x is a value within a dead zone, which is a predetermined range in the vicinity of zero, i.e., a value that is relatively close to zero, then the center of gravity desired velocity determiner 32 sets the desired center of gravity velocity additive amount in the X-axis direction Vb_cmd_by_ofs_x to zero.

Further, if the magnitude of the center of gravity offset influence amount in the X-axis direction Vofs_x is a value that deviates from the dead zone, then the center of gravity desired velocity determiner 32 determines the desired center of gravity velocity additive amount in the X-axis direction Vb_cmd_by_ofs_x such that the polarity thereof is the same as Vofs_x and the magnitude thereof increases as the magnitude of Vofs_x increases. However, the value of the desired center of gravity velocity additive amount Vb_cmd_by_ofs_x is restricted to the range from a predetermined upper limit value (>0) to a predetermined lower limit value (≤0).

The processing for determining the desired center of gravity velocity additive amount in the Y-axis direction Vb_cmd_by_ofs_y is the same as the processing described above.

Subsequently, the center of gravity desired velocity determiner 32 carries out, by a processor 32d shown in FIG. 4, the processing for determining a desired velocity V1_xy obtained by adding each component of the desired center of gravity velocity additive amount Vb_cmd_by_ofs_xy to each component of the basic velocity command Vjs_xy determined by the operation command converter 31. More specifically, the center of gravity desired velocity determiner 32 determines V1_xy (a set of V1_x and V1_y) by the processing denoted by V1_x=Vjs_x+Vb_cmd_by_ofs_x and V1_y=Vjs_y+Vb_cmd_by_ofs_y.

Further, the center of gravity desired velocity determiner 32 carries out the processing by a processor 32e. The processor 32e carries out limiting for determining a restricted center of gravity desired velocity Vb_cmd_xy (a set of Vb_cmd_x and Vb_cmd_y) as a desired velocity of the vehicle system total center of gravity obtained by restricting the combination of desired velocities V1_x and V1_y in order to prevent the rotational speed of each of the electric motors 8a and 8b constituting the actuator 8 of the first travel operation unit 3 from deviating from a predetermined permissible range.

In this case, if the set of the desired velocities V1_x and V1_y determined by the processor 32d lies within a predetermined region (e.g., an octagonal region) on a coordinate system, in which the axis of ordinate indicates the value of the desired velocity V1_x and the axis of abscissa indicates the value of the desired velocity V1_y, then the desired velocity V1_xy is determined directly as the restricted center of gravity desired velocity Vb_cmd_xy.

Further, if the set of the desired velocities V1_x and V1_y determined by the processor 32d deviates from the predetermined region on the coordinate system, then a set that has been restricted to lie on the boundary of the predetermined region is determined as the restricted center of gravity desired velocity Vb_cmd_xy.

The center of gravity desired velocity Vb_cmd_xy is determined on the basis of the basic velocity command Vjs_xy and the center of gravity offset influence amount Vofs_xy (or the center of gravity offset) as described above. This enables the rider to maneuver the vehicle 1 by operating the operation device, i.e., by operating the joystick 12, and by changing the posture of his/her body, i.e., by shifting his/her weight.

After carrying out the processing by the center of gravity desired velocity determiner 32, the first control processor 24 carries out the processing by the posture control arithmetic unit 34. The posture control arithmetic unit 34 carries out the processing illustrated by the block diagram of FIG. 4 to determine a first desired velocity Vw1_cmd_xy, which is the desired value of the travel velocity (translational velocity) of the first travel operation unit 3.

More specifically, the posture control arithmetic unit 34 first carries out, by the arithmetic unit 34b, the processing for subtracting each component of the center of gravity offset influence amount Vofs_xy from each component of the restricted center of gravity desired velocity Vb_cmd_xy, thereby determining a desired velocity with a compensated center of gravity offset Vb_cmpn_cmd_xy (a latest value).

Subsequently, according to expressions (4a) and (4b) given below, the posture control arithmetic unit 34 calculates a desired translational acceleration in the X-axis direction DVw1_cmd_x and a desired translational acceleration in the Y-axis direction DVw1_cmd_y of a desired translational acceleration DVw1_cmd_xy, which is the desired value of the translational acceleration at the ground contact point of the first travel operation unit 3, by carrying out the processing through the arithmetic units except for the arithmetic unit 34$b$ and an integral arithmetic unit 34$a$, which carries out integral operations.

$$DVw1\_cmd\_x = Kvb\_x \cdot (Vb\_cmpn\_cmd\_x - Vb\_estm1\_x) - Kth\_x \cdot \theta b\_act\_x - Kw\_x \cdot \omega b\_act\_x \quad (4a)$$

$$DVw1\_cmd\_y = Kvb\_y \cdot (Vb\_cmpn\_cmd\_y - Vb\_estm1\_y) - Kth\_y \cdot \theta b\_act\_y - Kw\_y \cdot \omega b\_act\_y \quad (4b)$$

In expressions (4a) and (4b), Kvb_xy, Kth_xy and Kw_xy denote predetermined gain values set beforehand.

The first term of the right side of expression (4a) denotes a feedback manipulated variable component based on the difference between the compensated center of gravity offset desired velocity in the X-axis direction Vb_cmpn_cmd_x (a latest value) of the vehicle system total center of gravity and a first estimated value Vb_estm1_x (a latest value), the second term thereof denotes a feedback manipulated variable component based on a measurement value (a latest value) of an actual tilt angle in the direction about the Y-axis θb_act_x of the rider mounting section 5, and the third term thereof denotes a feedback manipulated variable component based on a measurement value (a latest value) of an actual tilt angular velocity in the direction about the Y-axis ωb_act_x of the rider mounting section 5. Further, a desired translational acceleration in the X-axis direction DVw1_cmd_x is calculated as a resultant manipulated variable of the above feedback manipulated variable components.

Similarly, the first term of the right side of expression (4b) denotes a feedback manipulated variable component based on the difference between the compensated center of gravity-offset desired velocity in the Y-axis direction Vb_cmpn_cmd_y (a latest value) of the vehicle system total center of gravity and a first estimated value Vb_estm1_y (a latest value), the second term thereof denotes a feedback manipulated variable component based on a measurement value (a latest value) of an actual tilt angle in the direction about the X-axis θb_act_y of the rider mounting section 5, and the third term thereof denotes a feedback manipulated variable component based on a measurement value (a latest value) of an actual tilt angular velocity in the direction about the X-axis ωb_act_y of the rider mounting section 5. Further, a desired translational acceleration in the Y-axis direction DVw1_cmd_y is calculated as a resultant manipulated variable of the above feedback manipulated variable components.

Subsequently, the posture control arithmetic unit 34 integrates the components of the desired translational acceleration DVw1_cmd_xy by the integral arithmetic unit 34$a$, thereby determining a first desired velocity Vw1_cmd_xy (a latest value) of the first travel operation unit 3.

Then, the first control processor 24 controls the electric motors 8$a$ and 8$b$ constituting the actuator 8 of the first travel operation unit 3 according to the first desired velocity Vw1_cmd_xy determined as described above. More specifically, the first control processor 24 determines the current command values for the electric motors 8$a$ and 8$b$ by feedback control processing so as to make the actual rotational velocities (measurement values) of the electric motors 8$a$ and 8$b$ follow the desired values of the rotational velocities thereof specified by the first desired velocity Vw1_cmd_xy. The first control processor 24 then energizes the electric motors 8$a$ and 8$b$ according to the current command values.

In a state wherein the restricted center of gravity desired velocity Vb_cmd_xy remains at a fixed value and the motion of the vehicle 1 has been stabilized after the aforesaid processing, i.e., in a state wherein the vehicle 1 is traveling in a straight line at a fixed velocity, the vehicle system total center of gravity lies right above the ground contact point of the first travel operation unit 3. In this state, the actual tilt angle θb_act_xy of the rider mounting section 5 will be −Ofst_xy/(h−r_xy) according to expressions (1b) and (2b). The actual tilt angular velocity ωb_act_xy of the rider mounting section 5 will be zero and the desired translational acceleration DVw1_cmd_xy will be zero. This combined with the block diagram of FIG. 4 lead to the finding of the agreement between Vb_estm1_xy and Vb_cmd_xy.

In other words, the first desired velocity Vw1_cmd_xy of the first travel operation unit 3 is basically determined to converge the difference between the restricted center of gravity desired velocity Vb_cmd_xy of the vehicle system total center of gravity and the first estimated value Vb_estm1_xy to zero.

Further, the rotational speeds of the electric motors 8$a$ and 8$b$ constituting the actuator 8 of the first travel operation unit 3 are controlled so as not to deviate from a predetermined permissible range by the processing carried out by the processor 32$e$ while compensating for the influence on the deviation of the position of the vehicle system total center of gravity from the position of the reference portion Ps_xy in the inverted pendulum model.

Supplementarily, in expressions (4a) and (4b) given above, Vb_cmpn_cmd_x=Vb_cmd_x−Vofs_x=Vb_cmd_x−(Kth/h−r_x)·(1/Kvb)·Ofst_estm_x and Vb_cmpn_cmd_y=Vb_cmd_y−Vofs_y=Vb_cmd_y−(Kth/h−r_y)·(1/Kvb)·Ofst_estm_y. Therefore, expressions (4a) and (4b) can be rewritten to expressions (4a)' and (4b)', respectively, given below.

$$DVw1\_cmd\_x = Kvb \cdot (Vb\_cmd\_x - Vb\_estm1\_x) - Kth \cdot (Ofst\_estm\_x/(h - r\_x) + \theta b\_act\_x) - Kw\_x \cdot \omega b\_act\_x \quad (4a)'$$

$$DVw1\_cmd\_y = Kvb \cdot (Vb\_cmd\_y - Vb\_estm1\_y) - Kth \cdot (Ofst\_estm\_y/(h - r\_y) + \theta b\_act\_y) - Kw\_y \cdot \omega b\_act\_y \quad (4b)'$$

In this case, the second term on the right side of each of expressions (4a)' and (4b)' denotes a feedback manipulated variable for setting the position of the actual vehicle system total center of gravity in the X-axis direction and the Y-axis direction to a position right above the ground contact portion of the first travel operation unit 3.

This completes the detailed description of the processing by the first control processor 24 in the present embodiment.

The processing by the second control processor 25 will now be described with reference to FIG. 8. To summarize the processing by the second control processor 25, the second processor 25 determines if there is a request for turning the vehicle 1 (hereinafter referred to "the request for turning") or the level of the request for turning on the basis of an actual motional state or a desired motional state of the representative point of the vehicle 1 of the vehicle system total center of gravity or the like or the first travel operation unit 3 in the Y-axis direction (the lateral direction relative to the rider), or the motional state of the rider in relation to the aforesaid motional state.

According to the present embodiment, the estimated value Vb_estm1_y of the travel velocity of the vehicle system total center of gravity in the Y-axis direction calculated by the center of gravity velocity estimator 33 is used as an indicator for determining whether there is the request for turning or the level of the request for turning. Vb_estm1_y coincides with the travel velocity of the reference portion Ps_y in the Y-axis direction, so that it means the observed value of the travel velocity of the representative point in the Y-axis direction, the representative point being fixed relative to the rider mounting section 5 (or the base body 2).

If the second control processor 25 determines that there is the request for turning, then it decides a second desired velocity in the Y-axis direction Vw2_cmd_y of the second travel operation unit 4 such that the Vw2_cmd_y is different from a first desired velocity in the Y-axis direction Vw1_cmd_y of the first travel operation unit 3 so as to make the vehicle 1 turn.

To be more specific, the second control processor 25 carries out the aforesaid processing as follows. Referring to FIG. 8, the second control processor 25 first carries out the processing by a processor 41. The processor 41 receives the estimated value Vb_estm1_y (a latest value) of the travel velocity of the vehicle system total center of gravity in the Y-axis direction calculated by the center of gravity velocity estimator 33. The processor 41 then decides a dead zone processed velocity Vw1a_y on the basis of the Vb_estm1_y.

When the rider on the vehicle 1 wishes to turn the vehicle 1 to the right or left, the rider usually tilts his/her upper body to the right or left so as to shift his/her center of gravity to the right or left of the vehicle 1. At this time, the first desired velocity Vw1_cmd_y in the lateral direction of the first travel operation unit 3 determined by the control processing by the first control processor 24 will basically become a rightward or leftward travel velocity.

However, even when the rider does not intend to turn the vehicle 1, there are some cases where the upper body of the rider accidentally sways, causing the center of gravity of the rider to slightly shift to the right or left.

Figure 8:
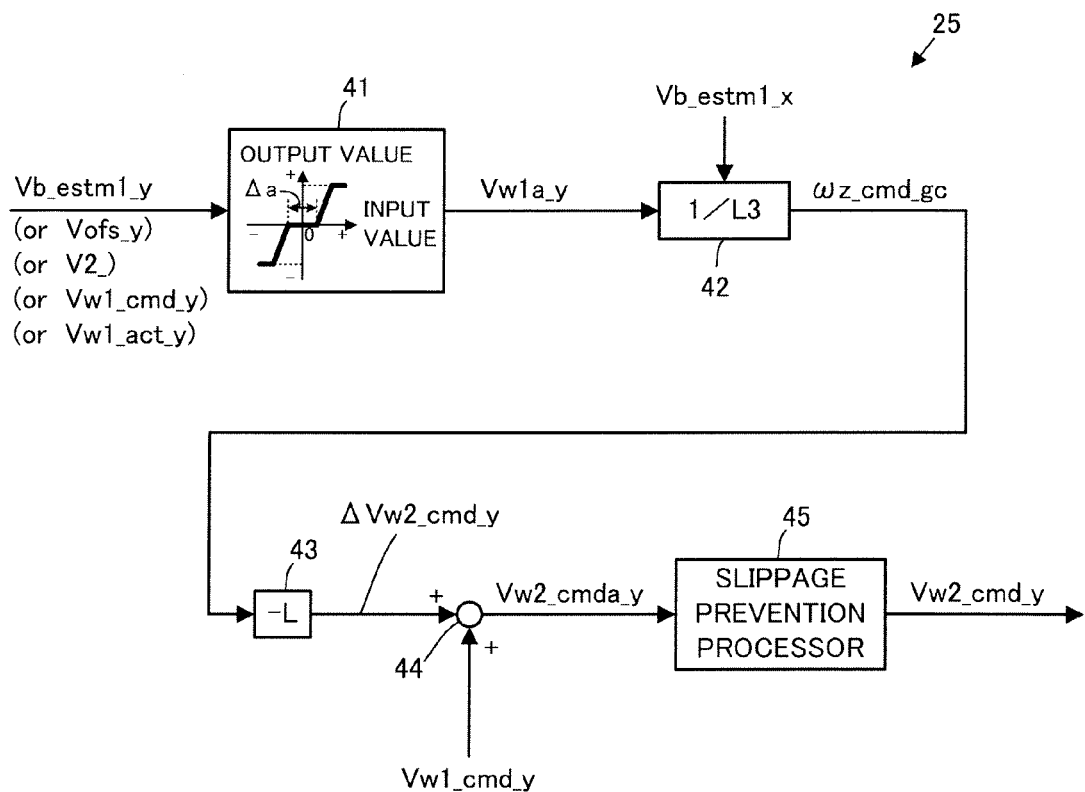
FIG. 8 is a block diagram illustrating the processing by a second control processor shown in FIG. 3.

Hence, the processor 41 determines the dead zone processed velocity Vw1a_y on the basis of Vb_estm1_y according to the characteristics illustrated in the graph of FIG. 8. More specifically, if the absolute value of Vb_estm1_y is relatively small and Vb_estm1_y takes a value within a predetermined range Δa around zero (if the absolute value of Vb_estm1_y is a predetermined value or less), then the processor 41 regards that there is no request for turning and sets Vw1a_y to zero.

On the other hand, if the absolute value of Vb_estm1_y is relatively large and Vb_estm1_y takes a value out of the predetermined range Δa (if the absolute value of Vb_estm1_y is larger than the predetermined value), then the processor 41 regards that there is the request for turning and sets Vw1a_y to a non-zero value.

More specifically, the processor 41 determines Vw1a_y on the basis of Vb_estm1_y such that the absolute value of Vw1a_y increases to a predetermined upper limit value or less as the absolute value of Vb_estm1_y increases. In this case, the polarity (direction) of Vw1a_y is to be the same as that of Vb_estm1_y. As will be discussed later, the increasing rate of Vw1a_y with respect to the increase in Vb_estm1_y is preferably one in order to set the center of turning to a desired position. In other words, the inclination is preferably one in an area excluding the dead zone and the saturation area in the graph of FIG. 8.

The parenthesized characters at the input end of the processor 41 in FIG. 8 relate to the modifications, which will be discussed later.

Subsequently, the second processor 25 carries out the processing by a processor 42. The processor 42 divides Vw1a_y by a distance L3 in the X-axis direction between the ground contact portion of the first travel operation unit 3 and the center of turn. Thus, the processor 42 determines a desired turn angular velocity ωz_cmd_gc, which is the desired value of the turn angular velocity (the angular velocity in the direction about the yaw axis) of the vehicle 1. In this case, the processor 42 sets the distance L3 on the basis of the estimated value of the actual travel velocity in the X-axis direction Vb_estm1_x (a latest value) of the vehicle system total center of gravity, which is the representative point of the vehicle 1.

The center of turn more specifically means the center of turning in the direction about the yaw axis of the entire vehicle 1 observed in a coordinate system that translatorily travels together with the first travel operation unit 3 on a floor surface.

In the present embodiment, the vehicle 1 is turned such that the vehicle 1 turns in the direction about the yaw axis, using, as the center of turning, a point on a floor surface at the rear side of the ground contact portion of the first travel operation unit 3 (i.e., behind the rider on the rider mounting section 5). If Vb_estm1_x is zero, then the distance L3 in the X-axis direction between the center of turning and the ground contact portion of the first travel operation unit 3 is set such that the center of turning is positioned in the vicinity of the ground contact portion of the second travel operation unit 4. For example, L3 is set to coincide or substantially coincide with the distance between the ground contact portion of the first travel operation unit 3 and the ground contact portion of the second travel operation unit 4.

If Vb_estm1_x is positive, which means traveling forward, then L3 is set such that the center of turning moves toward the ground contact portion of the first travel operation unit 3 from the ground contact portion of the second travel operation unit 4, i.e., the position of the center of turning in the X-axis direction approaches the position right under the rider sitting on the rider mounting section 5 (the position of the rider projected onto a floor surface). In other words, L3 is set such that L3 decreases as the magnitude (absolute value) of Vb_estm1_x increases. However, L3 is limited to a distance equal to or more than a predetermined lower limit value (>0).

If Vb_estm1_x is negative, which means traveling backward, then L3 is preferably set to the same value as that set in the case where Vb_estm1_x is zero or set such that L3 increases as the magnitude (absolute value) of Vb_estm1_x increases.

The processor 42 determines the desired turn angular velocity ωz_cmd_gc by dividing Vw1a_y by the distance L3 determined on the basis of Vb_estm1_x. The desired turn angular velocity ωz_cmd_gc is a left hand (counterclockwise) angular velocity in the case where Vw1a_y is a leftward velocity, while it is a right hand (clockwise) angular velocity in the case where Vw1a_y is a rightward velocity.

Subsequently, the second control processor 25 carries out the processing by a processor 43. The processor 43 multiplies the desired turn angular velocity ωz_cmd_gc determined by the processor 42 by a value that is (−1) times the predetermined distance L between the ground contact portion of the first travel operation unit 3 and the ground contact portion of the second travel operation unit 4 (=−L). Thus, the processor 43 calculates a relative travel velocity in the Y-axis direction ΔVw2_cmd_y of the second travel operation unit 4 with respect to the first travel operation unit 3 in the case where the vehicle 1 is turned at the desired turn angular velocity ωz_cmd_gc.

The relative travel velocity in the Y-axis direction ΔVw2_cmd_y of the second travel operation unit 4 determined as described above becomes zero in the case where ωz_cmd_gc=0 (i.e., in the case where there is no request for turning). Further, ΔVw2_cmd_y becomes a rightward velocity in the case where ωz_cmd_gc is a leftward turn angular velocity and it becomes a leftward velocity in the case where ωz_cmd_gc is a rightward turn angular velocity. Hence, ΔVw2_cmd_y in the case where there is the request for turning is a velocity in the opposite direction from Vw1a_y or Vb_estm1_y.

Subsequently, the second control processor 25 carries out the processing by a processor 44. The processor 44 adds the relative travel velocity in the Y-axis direction ΔVw2_cmd_y of the second travel operation unit 4 to the first desired velocity in the Y-axis direction Vw1_cmd_y (a latest value) of the first travel operation unit 3 determined by the first control processor 24. Thus, the processor 44 determines a basic value Vw2_cmda_y (a latest value) of the second desired velocity in the Y-axis direction Vw2_cmd_y of the second travel operation unit 4.

Subsequently, the second control processor 25 carries out the processing by a processor 45. The processor 45 carries out slippage prevention processing for preventing slippage of the second travel operation unit 4 so as to determine the second desired velocity in the Y-axis direction Vw2_cmd_y of the second travel operation unit 4.

In this case, if it is predicted that the slippage of the second travel operation unit 4 is likely to happen due to, for example, an excessively large absolute value of the basic value Vw2_cmda_y, then the processor 45 sets the second desired velocity in the Y-axis direction Vw2_cmd_y of the second travel operation unit 4 to a velocity corrected over the basic value Vw2_cmda_y. If it is predicted that the slippage of the second travel operation unit 4 will not happen, then the processor 45 directly determines the basic value Vw2_cmda_y as the second desired velocity in the Y-axis direction Vw2_cmd_y of the second travel operation unit 4.

The processing by the processor 45 may be omitted if a sufficient frictional force between the second travel operation unit 4 and a floor surface is secured by, for example, pressing the second travel operation unit 4 against the floor surface by a spring or the like.

Then, the second control processor 25 controls the electric motor 17, which acts as the actuator of the second travel operation unit 4, according to the second desired velocity Vw2_cmd_xy determined as described above. More specifically, the second control processor 25 determines a current command value for the electric motor 17 by feedback control processing so as to make the actual rotational speed (measured value) follow the desired value of the rotational speed of the electric motor 17 specified by the second desired velocity Vw2_cmd_xy. Then, the second control processor 25 energizes the electric motor 17 according to the current command value.

The control processing by the second control processor 25 is carried out as described above. Thus, the second desired velocity in the Y-axis direction Vw2_cmd_y of the second travel operation unit 4 is basically determined to be the velocity obtained by adding the relative travel velocity ΔVw2_cmd_y to the first desired velocity in the Y-axis direction Vw1_cmd_y (a latest value) of the first travel operation unit 3.

In this case, if it is determined that the absolute value of the estimated value of the travel velocity in the Y-axis direction Vb_estm1_y of the vehicle system total center of gravity is sufficiently small and there is no request for turning, then ΔVw2_cmd_y will be zero (ΔVw2_cmd_y=0). Hence, the second desired velocity in the Y-axis direction Vw2_cmd_y of the second travel operation unit 4 is basically determined to coincide with the first desired velocity in the Y-axis direction Vw1_cmd_y of the first travel operation unit 3.

Meanwhile, if it is determined that the absolute value of the estimated value of the travel velocity in the Y-axis direction Vb_estm1_y of the vehicle system total center of gravity is relatively large and there is the request for turning, then ΔVw2_cmd_y will be determined to be a velocity in the opposite direction from that of Vb_estm1_y. Hence, the second desired velocity in the Y-axis direction Vw2_cmd_y of the second travel operation unit 4 is basically determined to be a velocity which is in the same direction as the first desired velocity in the Y-axis direction Vw1_cmd_y of the first travel operation unit 3 and which is smaller than Vw1_cmd_y (a zero velocity or a velocity close to zero), or determined to be a velocity which is in the opposite direction from that of the first desired velocity in the Y-axis direction Vw1_cmd_y of the first travel operation unit 3.

The vehicle 1 according to the present embodiment described above enables the translational travel of the vehicle 1 in the X-axis direction to be accomplished according to the travel forward/backward command output in response to a longitudinal tilt (in the X-axis direction) of the rider mounting section 5 (or the base body 2) caused by the movement of the body of the rider on the rider mounting section 5 or in response to the operation of swinging the joystick 12 in the longitudinal direction.

In a situation wherein the lateral movement of the center of gravity of the rider on the rider mounting section 5 (the relative movement with respect to the rider mounting section 5) is relatively small and the estimated value of the travel velocity in the Y-axis direction Vb_estm1_y of the vehicle system total center of gravity falls within a predetermined range Δa in the vicinity of zero, the translational travel of the vehicle 1 in the Y-axis direction can be accomplished according to the lateral travel command issued in response to a small tilt of the rider mounting section 5 (or the base body 2) in the lateral direction (the Y-axis direction) or in response to the swinging of the joystick 12 in the lateral direction.

Further, combining the aforesaid translational travels enables the vehicle 1 to translatorily travel in an arbitrary direction at an angle relative the X-axis direction and the Y-axis direction.

If the estimated value of the travel velocity in the Y-axis direction Vb_estm1_y of the vehicle system total center of gravity deviates from the predetermined range Δa in the vicinity of zero due to a relatively large lateral movement of the center of gravity of the rider on the rider mounting section 5, then the second desired velocity in the Y-axis direction Vw2_cmd_y of the second travel operation unit 4 is determined to be a velocity obtained by shifting the first desired velocity in the Y-axis direction Vw1_cmd_y of the second travel operation unit 4 by ΔVw2_cmd_y. In this case, the second desired velocity Vw2_cmd_y is determined to be a velocity that causes the vehicle 1 to turn about the center of turning at the rear side of the ground contact portion of the first travel operation unit 3.

This enables the rider to turn the vehicle 1 simply by moving his/her upper body to move his/her center of gravity in the lateral direction. In this case, if the rider moves his/her center of gravity to the left, then the vehicle 1 turns to the left. If the rider moves his/her center of gravity to the right, then the vehicle 1 turns to the right. Thus, the movement of the center of gravity of the rider in the lateral direction matches the turning direction of the vehicle 1.

Hence, the rider can easily turn the vehicle 1 by moving his/her upper body in the lateral direction and also easily learn the steering operation for turning the vehicle 1.

If, for example, the rider attempts to turn (change the direction of) the vehicle 1 while the vehicle 1 is in a stopped state (i.e., the travels of the first travel operation unit 3 and the second travel operation unit 4 have substantially finished), then the first travel operation unit 3 supporting the weight of the rider and the weight of the majority of the vehicle 1 will move in the lateral direction, i.e., the Y-axis direction. Hence, it is possible to prevent a large frictional force from being applied to the first travel operation unit 3. This permits smooth turning (or direction changing) of the vehicle 1.

Further, when the rider intends to turn the vehicle 1 while moving the vehicle 1 forward (in the positive direction of the X-axis), the distance L3 between the ground contact portion of the first travel operation unit 3 and the center of turning decreases as the magnitude (absolute value) of the estimated value of the travel velocity in the X-axis direction of the vehicle system total center of gravity serving as the representative point of the vehicle 1 increases. This enables the rider to easily set the traveling trajectory at the time of turning of the vehicle 1 to a desired trajectory.

Further, in the present embodiment, the center of gravity offset estimator 35a of the first control processor 24 estimates the center of gravity offset amount Ofst_xy of the vehicle system total center of gravity by carrying out the processing illustrated in FIG. 7. This permits highly accurate estimation of the center of gravity offset amount. Then, the desired velocity of the vehicle system total center of gravity (the restricted desired velocity of the center of gravity) Vb_cmd_xy is determined as described above on the basis of the estimated value Ofst_estm_xy of the center of gravity offset amount Ofst_xy. Thus, the influence exerted by the center of gravity offset amount Ofst_xy on the behavior of the vehicle 1 can be properly compensated for.

Moreover, in the vehicle 1 according to the present embodiment, the swing amount (the amount of swing in the direction about the Y-axis) of the second travel operation unit 4 relative to the base body 2 is mechanically restricted to a predetermined range defined by the stoppers 16 and 16. This arrangement makes it possible to prevent especially the rider mounting section 5 from excessively inclining to the rear side of the rider.

Second Embodiment and Third Embodiment

A second and a third embodiments according to the present invention will now be described with reference to FIG. 9A and FIG. 9B. The second and the third embodiments differ from the first embodiment only partly in the processing carried out by the second control processor 25. In the description of the second and the third embodiments, the description of the same aspects as those of the first embodiment will be omitted.

The parenthesized characters in FIG. 9A and FIG. 9B relate to modifications to be discussed hereinafter.

Figure 9A:
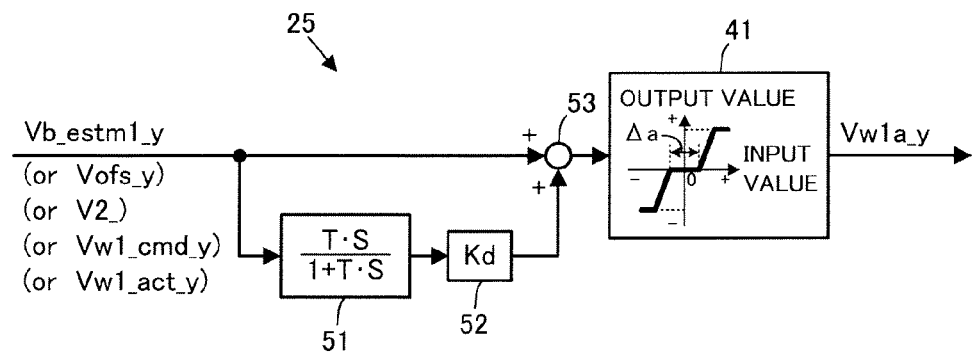
FIG. 9A is a block diagram illustrating the processing by an essential section of a second control processor in a second embodiment of the present invention.

FIG. 9A illustrates the processing carried out by a second control processor 25 to determine Vw1a_y (the desired value of a dead zone processed velocity) on the basis of the estimated value of the travel velocity in the Y-axis direction Vb_estm1_y of the vehicle system total center of gravity in the second embodiment.

In the second embodiment, the second control processor 25 has a low cut filter (pseudo differential filter) 51 to which the estimated value of the travel velocity in the Y-axis direction Vb_estm1_y of the vehicle system total center of gravity is supplied. The second control processor 25 adds a value, which is obtained by multiplying an output of the low cut filter 51 (a value obtained by subjecting Vb_estm1_y to a low cut characteristic filtering) by a gain Kd of a predetermined value in a processor 52, to Vb_estm1_y by an arithmetic unit 53.

Subsequently, the second control processor 25 inputs the output of the arithmetic unit 53 instead of Vb_estm1_y to a processor 41, which is the same as that in the first embodiment, and carries out the processing by the processing 41 in the same manner as that in the first embodiment, thereby determining Vw1a_y. In other words, Vw1a_y corresponds to a result obtained by processing Vb_estm1_y through a phase compensation circuit (filter).

The second embodiment is the same as the first embodiment except for the aspects described above.

According to the second embodiment described above, Vw1a_y and therefore the desired turn angular velocity ωz_c-md_gc are determined on the basis of the phase compensation value (the output of the arithmetic unit 53) of the estimated value of the travel velocity in the Y-axis direction Vb_estm1_y of the vehicle system total center of gravity.

This arrangement makes it possible to improve the responsiveness of the turning behavior of the vehicle 1 relative to the movement of the vehicle system total center of gravity in the Y-axis direction attributable to the movement of the upper body of the rider.

Figure 9B:
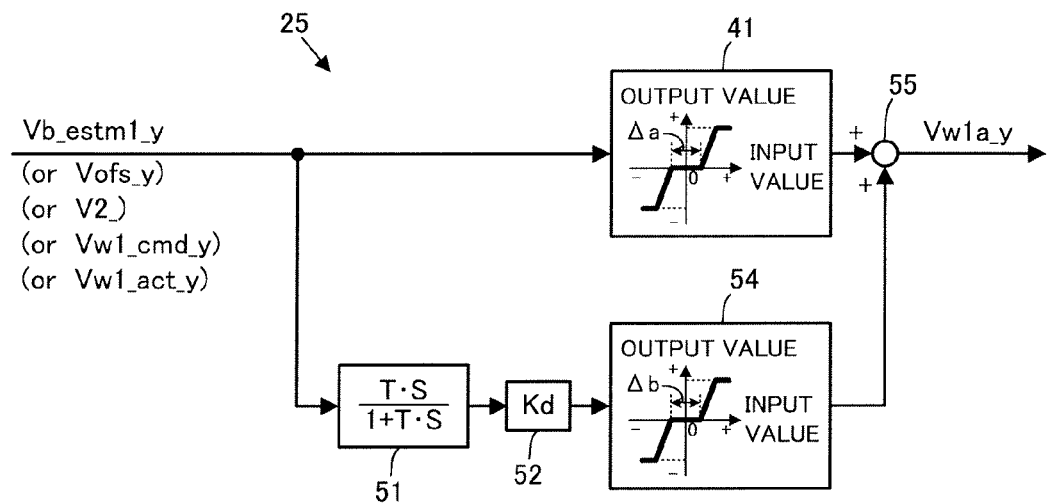
FIG. 9B is a block diagram illustrating the processing by an essential section of a second control processor in a third embodiment of the present invention.

FIG. 9B illustrates the processing carried out by a second control processor 25 to determine Vw1a_y (the desired value of a dead zone processed velocity) on the basis of the estimated value of the travel velocity in the Y-axis direction Vb_estm1_y of the vehicle system total center of gravity in the third embodiment.

In the third embodiment, as with the first embodiment, the estimated value of the travel velocity in the Y-axis direction Vb_estm1_y of the vehicle system total center of gravity is supplied to a processor 41.

Further, the second control processor 25 according to the third embodiment is provided with a processor 54, which receives an output of a processor 52, in addition to the same low cut filter 51 and processor 52 as those in the second embodiment. The processor 54 carries out processing similar to the processing carried out by the processor 41.

To be more specific, if the absolute value of an input value of the processor 54 is relatively small and the input value falls within a predetermined range Δb around zero (if the absolute value of the input value is a predetermined value or less), then the processor 54 sets an output value to zero.

Conversely, if the absolute value of an input value of the processor 54 is relatively large and therefore the input value deviates from the predetermined range Δb (if the absolute value of the input value is larger than the predetermined value), then the processor 54 sets an output value to a non-zero value.

To be more specific, the processor 54 determines an output value on the basis of an input value of the processor 54 such that the absolute value of the output value increases to a predetermined upper limit value or less as the absolute value of the input value of the processor 54 increases. In this case, the polarity (direction) of the output value of the processor 54 is to be the same as that of the input value.

Then, the second processor 25 in the third embodiment adds up the output value of the processor 41 and the output value of the processor 54 by an arithmetic unit 55 so as to determine Vw1a_y.

The third embodiment is the same as the first embodiment except for the aspects described above.

According to the third embodiment, Vw1a_y is determined by adding up a component determined by the processor 41 on the basis of the estimated value of the travel velocity in the Y-axis direction Vb_estm1_y of the vehicle system total center of gravity and a component determined by the processor

54 on the basis of the output of the low cut filter 51, which depends on the temporal change rate of Vb_estm1_y.

Thus, as with the second embodiment, the third embodiment permits improved responsiveness of the turning behavior of the vehicle 1 relative to the movement of the vehicle system total center of gravity in the Y-axis direction caused by the movement of the upper body of the rider.

Modifications

A few modifications of the embodiments described above will now be described.

According to the embodiments described above, in the processing by the second control processor 25, the estimated value of the travel velocity in the Y-axis direction Vb_estm1_y of the vehicle system total center of gravity calculated by the center of gravity velocity estimator 33 has been used as the indicator for determining whether there is the request for turning or the level of the request for turning. Alternatively, however, a parameter other than Vb_estm1_y may be used as the indicator for determining whether there is the request for turning or the level of the request for turning.

For example, the desired turn angular velocity ωz_cmd_gc of the vehicle 1 may be determined by carrying out the processing by the processors 41 and 42, as with the aforesaid embodiments by using the center of gravity offset influence amount in the Y-axis direction Vofs_y (or an estimated value of the center of gravity offset amount Ofst_estm_y) calculated by a center of gravity offset influence amount calculator 35b of the first control processor 24, or a restricted velocity command in the Y-axis direction V2_y determined by a processor 32e, a first desired velocity in the Y-axis direction Vw1_cmd_y of the first travel operation unit 3 determined by a posture control arithmetic unit 34, or an observed value of an actual travel velocity in the Y-axis direction Vw1_act_y of the first travel operation unit 3 (e.g., the value of Vw1_act_y estimated from a detected value of the rotational speed of the electric motor 8b), in place Vb_estm1_y, as indicated by the parenthesized reference characters in FIG. 8 or FIG. 9A or FIG. 9B.

In this case, in the processor 41, a range Δa of the value of an input parameter that sets an output value thereof to zero (the magnitudes of the upper limit value and the lower limit value of the range Δa) and the change rate of an output value relative to a change in the value of the input parameter that is out of the range Δa is usually set for each type of input parameter. The same applies to the processor 54 shown in FIG. 9B.

Even in the case where the aforesaid parameters are used in place of Vb_estm1_y, the vehicle 1 can be turned according to the movement of the upper body of the rider in the lateral direction, as with the embodiments described above.

In the case where the center of gravity offset influence amount in the Y-axis direction Vofs_y calculated by the center of gravity offset influence amount calculator 35b of the first control processor 24 is used in place of Vb_estm1_y, the Vofs_y is proportional to the estimated value of the center of gravity offset amount in the Y-axis direction Ofst_estm_y. Accordingly, setting the desired turn angular velocity ωz_cmd_gc of the vehicle 1 on the basis of Vofs_y is equivalent to setting the desired turn angular velocity ωz_cmd_gc of the vehicle 1 on the basis of the estimated value of the center of gravity offset amount in the Y-axis direction Ofst_estm_y.

Hence, an embodiment according to the aforesaid sixth aspect of the invention is created by using Vofs_y in place of Vb_estm1_y. In this case, the center of gravity offset estimator 32a corresponds to the total center of gravity offset estimating unit in the sixth aspect of the invention, and Ofst_estm_y corresponds to the lateral total center of gravity offset amount in the sixth aspect of the invention. In this case, even if the lateral travel command is output by the joystick 12, no turn based on the command will take place.

Further, in the embodiments described above, the distance L3 between the center of turning and the ground contact portion of the first travel operation unit 3 at the time of turning of the vehicle 1 has been changed on the basis of the estimated value (observed value) of the travel velocity in the longitudinal direction Vb_estm_x of the vehicle system total center of gravity. Alternatively, however, L3 may be set to a fixed value established beforehand.

Further, in the first embodiment, the desired turn angular velocity ωz_cmd_gc has been set to zero in the case where the estimated value of the travel velocity in the Y-axis direction Vb_estm1_y of the vehicle system total center of gravity, which is an input parameter of the processor 41, is a value within the predetermined range Δa in the vicinity of zero. Alternatively, however, the desired turn angular velocity ωz_cmd_gc may be set to cause the vehicle 1 to turn even when the input parameter falls within the predetermined range Δa. In other words, Δa may be set to zero.

Further, in the embodiments described above, the second travel operation unit 4 has been disposed behind the first travel operation unit 3. Alternatively, however, the second travel operation unit 4 may be disposed in front of the first travel operation unit 3. In this case, the turning of the vehicle 1 can be accomplished by setting the travel velocity in the Y-axis direction of the second travel operation unit 4 to be larger than the travel velocity in the Y-axis direction of the first travel operation unit 3 at the time of turning.

In the embodiments described above, the joystick 12 has been used as the operation device for outputting the forward/backward travel command and the lateral travel command. Alternatively, however, a trackball or a touch-pad may be used in place of a joystick, or a load sensor adapted to detect a place touched by a rider or a posture sensor held by a rider may be used. Further alternatively, a portable terminal, such as a smartphone, may be used as the operation device.

Further, the operation device, such as the joystick 12, may be omitted or an operation device that outputs only the forward/backward travel command may be provided.

Further, the second travel operation unit 4 may have a configuration other than the omniwheel and may have, for example, the same configuration as that of the first travel operation unit 3.

Further alternatively, an arrangement may be adopted such that a rider selectively operates selector switches or the like to switch between a mode in which the rider moves his/her body in the lateral direction thereby to turn the vehicle 1 and a mode in which the rider operates an operation device, such as a joystick, to turn the vehicle 1.

Further, in the embodiments described above, the vehicle 1 has made a left hand turn (turned counterclockwise) when the rider moves his/her center of gravity to the left, while the vehicle 1 has made a right hand turn (turned clockwise) when the rider moves his/her center of gravity to the right. Alternatively, however, the arrangement may be reversed, and the vehicle 1 may make a right hand turn (turn clockwise), using a point on a floor surface in front of the ground contact portion of the first travel operation unit 3 (or in front of the rider mounting section 5) as the center of turning when the rider moves his/her center of gravity to the left, and the vehicle 1 may make a left hand turn (turn counterclockwise), using a point on the floor surface in front of the ground contact portion of the first travel operation unit 3 (or in front of the rider mounting section 5) as the center of turning when the rider moves his/her center of gravity to the right.

What is claimed is:

1. An inverted pendulum type vehicle having at least a first travel operation unit capable of traveling on a floor surface, a first actuator that drives the first travel operation unit, a base body to which the first travel operation unit and the first actuator are installed, and a rider mounting section attached to the base body such that the rider mounting section is tiltable relative to a vertical direction, wherein the first travel operation unit is configured to be capable of traveling in all directions, including a longitudinal direction and a lateral direction relative to a rider on the rider mounting section, by a driving force of the first actuator, the inverted pendulum type vehicle comprising:
   a second travel operation unit, which is connected to the first travel operation unit or the base body with an interval provided from the first travel operation unit in the longitudinal direction and which is configured to be capable of traveling in all directions on a floor surface;
   a second actuator which generates a driving force for causing the second travel operation unit to travel at least in the lateral direction; and
   a control unit, which controls the first actuator and the second actuator so as to cause the first travel operation unit and the second travel operation unit to carry out travel motions thereof according to at least a tilt of the rider mounting section,
   wherein the control unit is configured to carry out turning control processing, which is control processing for controlling the first actuator and the second actuator such that the travel velocity of the first travel operation unit and the travel velocity of the second travel operation unit in the lateral direction are different from each other in a situation in which a predetermined representative point of the inverted pendulum type vehicle that has been established beforehand or the first travel operation unit is to be moved leftward or rightward.

2. The inverted pendulum type vehicle according to claim 1,
   wherein the control unit is configured to carry out the turning control processing in a situation, in which the magnitude of a desired value or an observed value of the travel velocity of the predetermined representative point or the first travel operation unit traveling rightward or leftward is a predetermined value or more, so as to control the first actuator and the second actuator such that the travel velocity of the first travel operation unit and the travel velocity of the second travel operation unit in the lateral direction are the same with each other in a situation, in which the magnitude of the desired value or the observed value of the travel velocity is smaller than the predetermined value.

3. The inverted pendulum type vehicle according to claim 2,
   wherein the control unit carries out the turning control processing in a situation, in which the magnitude of the observed value of the velocity of a rightward or leftward travel of the predetermined representative point, which has been set beforehand as a point fixed with respect to the rider mounting section, is a predetermined value or more.

4. The inverted pendulum type vehicle according to claim 1,
   wherein the control unit is configured to determine a desired value of a turn angular velocity of the inverted pendulum type vehicle on the basis of at least the desired value or the observed value of the velocity of the rightward or leftward travel of the predetermined representative point or the first travel operation unit and to control the velocities of the travels of the first travel operation unit and the second travel operation unit in the lateral direction on the basis of the desired value of the turn angular velocity through the intermediary of the first actuator and the second actuator, respectively, in the turning control processing.

5. An inverted pendulum type vehicle having at least a first travel operation unit capable of traveling on a floor surface, a first actuator that drives the first travel operation unit, a base body to which the first travel operation unit and the first actuator are installed, and a rider mounting section attached to the base body such that the rider mounting section is tiltable relative to a vertical direction, wherein the first travel operation unit is configured to be capable of traveling in all directions, including a longitudinal direction and a lateral direction relative to a rider on the rider mounting section, by a driving force of the first actuator, the inverted pendulum type vehicle comprising:
   a second travel operation unit, which is connected to the first travel operation unit or the base body with an interval provided from the first travel operation unit in the longitudinal direction and which is configured to be capable of traveling in all directions on a floor surface;
   a second actuator which generates a driving force for causing the second travel operation unit to travel at least in the lateral direction; and
   a control unit, which controls the first actuator and the second actuator so as to cause the first travel operation unit and the second travel operation unit, respectively, to carry out travel motions thereof according to at least a tilt of the rider mounting section,
   wherein the control unit is configured to carry out turning control processing, which is control processing for controlling the first actuator and the second actuator such that the travel velocity of the first travel operation unit and the travel velocity of the second travel operation unit in the lateral direction are different from each other in a situation, in which the rider on the rider mounting section has shifted his/her center of gravity to the right or left relatively with respect to the rider mounting section.

6. An inverted pendulum type vehicle having at least a first travel operation unit capable of traveling on a floor surface, a first actuator that drives the first travel operation unit, a base body to which the first travel operation unit and the first actuator are installed, and a rider mounting section attached to the base body such that the rider mounting section is tiltable relative to a vertical direction, wherein the first travel operation unit is configured to be capable of traveling in all directions, including a longitudinal direction and a lateral direction relative to a rider on the rider mounting section, by a driving force of the first actuator, the inverted pendulum type vehicle further comprising:
   a second travel operation unit, which is connected to the first travel operation unit or the base body with an interval provided from the first travel operation unit in the longitudinal direction and which is configured to be capable of traveling in all directions on a floor surface;
   a second actuator which generates a driving force for causing the second travel operation unit to travel at least in the lateral direction;
   a control unit, which controls the first actuator and the second actuator so as to cause the first travel operation unit and the second travel operation unit, respectively, to carry out travel motions thereof according to at least a tilt of the rider mounting section; and a total center of gravity offset estimating unit which estimates a lateral total center of gravity offset amount, which is the amount of a lateral relative movement of the total center of gravity of the rider and the inverted pendulum type vehicle with respect to the rider mounting section, the lateral total center of gravity offset amount being accrued due to the rider on the rider mounting section having shifted his/her center of gravity to the right or left relatively with respect to the rider mounting section, wherein the control unit is configured to carry out turning control processing for controlling the travel velocity of the first travel operation unit and the travel velocity of the second travel operation unit in the lateral direction through the first actuator and the second actuator, respectively, on the basis of a lateral total center of gravity offset amount estimated by the total center of gravity offset estimating unit so as to turn the inverted pendulum type vehicle in a situation, in which the rider on the rider mounting section has shifted his/her center of gravity to the right or left relatively with respect to the rider mounting section.

7. The inverted pendulum type vehicle according to claim 6, wherein the control unit is configured to carry out the turning control processing in a situation, in which the magnitude of the estimated value of the lateral total center of gravity offset amount is a predetermined value or more, so as to control the first actuator and the second actuator such that the travel velocity of the first travel operation unit and the travel velocity of the second travel operation unit in the lateral direction are the same with each other in a situation, in which the magnitude of the estimated value of the lateral total center of gravity offset amount is smaller than the predetermined value.

8. The inverted pendulum type vehicle according to claim 7, wherein the control unit is configured to determine a desired value of a turn angular velocity of the inverted pendulum type vehicle on the basis of at least the estimated value of the lateral total center of gravity offset amount and to control the velocities of the travels of the first travel operation unit and the second travel operation unit in the lateral direction on the basis of the desired value of the turn angular velocity through the intermediary of the first actuator and the second actuator, respectively, in the turning control processing.

* * * * *